(12) United States Patent
Pyle

(10) Patent No.: US 11,974,702 B2
(45) Date of Patent: *May 7, 2024

(54) FOOD CONTAINER WITH TIMER

(71) Applicant: Natosha Pyle, Frisco, TX (US)

(72) Inventor: Natosha Pyle, Frisco, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/108,126

(22) Filed: Feb. 10, 2023

(65) Prior Publication Data

US 2023/0200592 A1 Jun. 29, 2023

Related U.S. Application Data

(63) Continuation of application No. 17/351,063, filed on Jun. 17, 2021, now Pat. No. 11,602,245.

(51) Int. Cl.
*A61J 7/04* (2006.01)
*A47J 47/02* (2006.01)
*B65D 51/24* (2006.01)

(52) U.S. Cl.
CPC ............ *A47J 47/02* (2013.01); *B65D 51/245* (2013.01); *B65D 2203/12* (2013.01)

(58) Field of Classification Search
CPC .... B65D 2203/12; B65D 25/20; B65D 23/12; B65D 51/248; A61J 7/0472; A61J 7/0445; A61J 1/18; A61J 2200/30; G04F 1/005
USPC .................. 206/459.1, 557, 534; 368/10, 89
See application file for complete search history.

(56) References Cited

U.S. PATENT DOCUMENTS

| 5,335,509 A * | 8/1994 | Namisniak ................ G09F 7/04 |
| | | 206/459.1 |
| 2006/0181961 A1* | 8/2006 | Hobkirk ................ G04B 47/02 |
| | | 368/10 |
| 2008/0141457 A1* | 6/2008 | Forshpan ................ A47D 9/00 |
| | | 5/100 |
| 2014/0016442 A1* | 1/2014 | Hoover ..................... G04F 3/08 |
| | | 368/109 |
| 2021/0122529 A1* | 4/2021 | Driscoll ............... H01H 43/028 |

* cited by examiner

*Primary Examiner* — King M Chu
(74) *Attorney, Agent, or Firm* — Weiss & Moy, PC; Jeffrey D. Moy

(57) ABSTRACT

A food storage container system which includes one or more food storage container assemblies. Each food storage container assembly has a container body and a lid designed and configured to work in functional combination to promote food storage means and with the lid containing timing means for tracking time elapsing during use (when storing food). The food storage container assemblies may be made of glass, plastic or other suitably equivalent material that is food- and dishwasher-safe. The lid of the container will be slidable into the base with an indented handle for sliding in and out of the body. The invention will contain an attachable timer that will slid into frond of container and be locked with a snapable button. The timer may comprise a display screen that shows a digital or non-digital display of time.

7 Claims, 39 Drawing Sheets

INDENT HANDLE

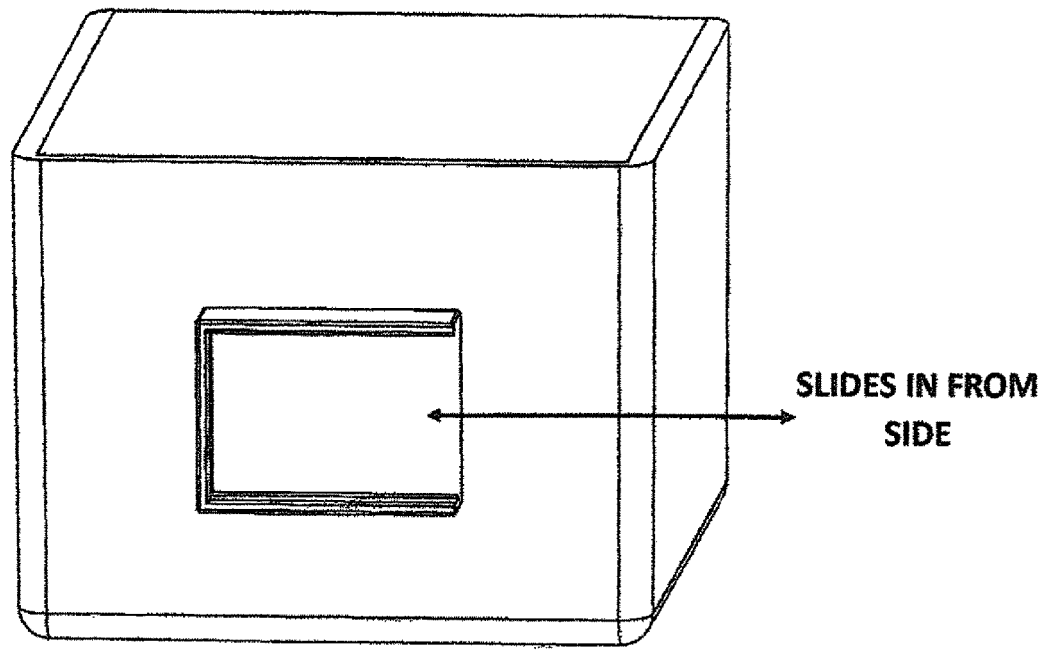
FIG. 21A
FIG. 21B
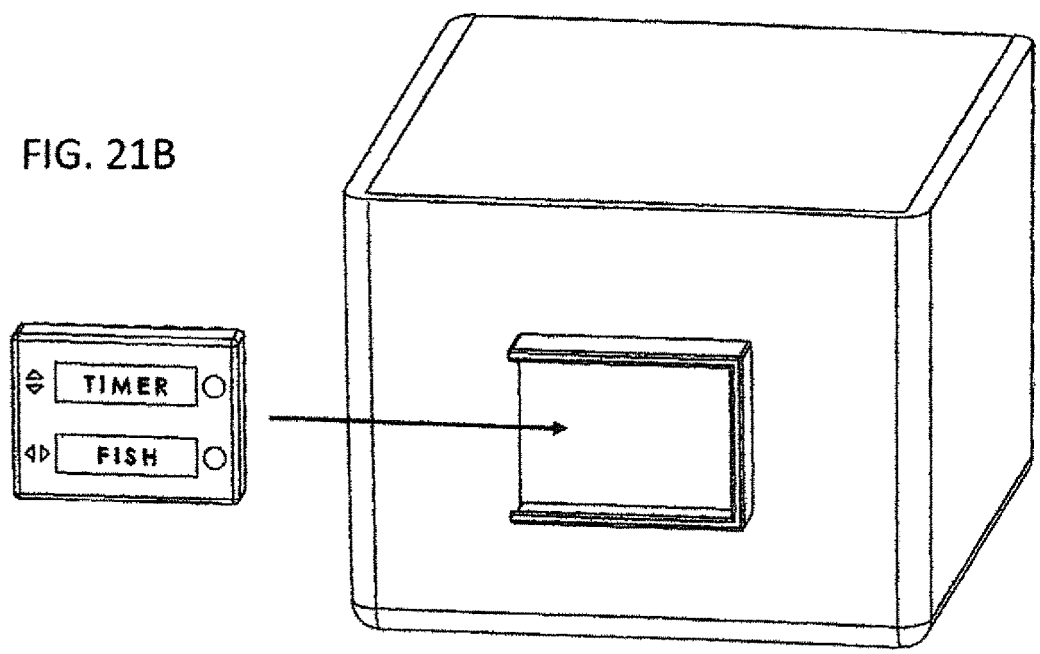

VERTICAL CHARGER
'MULTIPLE'

HORIZONTAL CHARGER
'MULTIPLE'

CORD

**HORIZONTAL CHARGER
'SINGLE'**

FOOD CONTAINER WITH TIMER

BACKGROUND OF THE INVENTION

1. Field of the Invention

The present invention relates generally to the field of containers for storage and more specifically relates to a food storage container system.

2. Description of the Related Art

Individuals eat comestibles to sustain life. Often times the amount of food prepared is not consumed in a single meal. Many foods are stored in containers. These containers with food in them may be stored for a duration in refrigerators and freezers in an attempt to avoid spoilage. Often it is difficult to track storage time on one or more containers of food. Using conventional containers the food may expire without notice to the consumer which may be unpleasant upon consumption, or worse yet, unhealthy. This situation is undesirable. Further, food waste is also undesirable, given the cost of food.

Various attempts have been made to solve problems found in storage containers art. Among these are found in: U.S. Patent and Publication Nos. 2006/0181961; 5,711,160; 6,000,159; 5,798,694; 8,020,507; and 8,441,893. More specifically, Publication No. 2006/0181961 discloses a perishable item expiration timer including a timer for displaying the conclusion of a first period of time after a perishable item has been placed into a container. Appropriate periods of time include 3 days, 7 days, or other time periods of any duration selected to correspond to the useful life of a perishable item. The timer includes a display, a first programming button permanently associated with the first period of time, and a timing processor electrically connected between the display and the first programming button. The timing processor may be configured to count the first period of time upon receipt of an input from the first programming button. The timing processor is further configured to cause the display to indicate the conclusion of the first period of time. The timer may include a housing which is selectively attachable to the container. Alternatively, the display, first programming button, and timing processor may be permanently integrated into either the lid or body of the container. This prior art is representative of storage means.

None of the above inventions and patents, taken either singly or in combination, is seen to describe the invention as claimed. Thus, a need exists for a reliable food container for storage means, and to avoid the above-mentioned problems.

BRIEF SUMMARY OF THE INVENTION

The present invention advantageously fills the aforementioned deficiencies by providing a useful means of preserving chilled food by creating food containers for the refrigerator that have a built-in timer and display to provide consumers with a means of knowing how long their food, especially left-overs, have been in the fridge. Alternative embodiments may form an attachable timer to already existing refrigerable food containers. This will effectively eliminate the need for consumers to question whether their food is safe to eat. The present invention is superior to other systems in that it effectively tracks the duration for which food is stored via reliable time-tracking means. Further, the device is designed to allow for ready display of the time-tracking.

A food storage container system is disclosed herein. The food storage container system preferably comprises one or more food storage container assemblies. Each food storage container assembly preferably comprises a container body and a lid designed and configured to work in functional combination to promote food storage means and with the lid containing timing means for tracking time elapsing during use (when storing food). The food storage container assemblies may comprise glass, plastic or other suitably equivalent material that is food-safe. The food storage container assemblies are able to withstand cool temperatures and may or may not be insulated. As designed, the food storage container assemblies are dishwasher safe in preferred embodiments. The food storage container assemblies may each comprise a powering means and necessary circuitry to power and control the time-tracking means (timer or the like). A microchip may also be used. The microchip will have the ability to communicate with smart phones alerting the consumer when their food is about to expire. The blue tooth could include app that gives recipe suggestions based on the left overs or stored food. There may be a place on the display to select a food type as a label. Chicken, veggies, fruit, etc. The present invention is designed to promote food storage over a duration and to track timing on the stored food. In this way the consumer-user can avoid eating spoiled food and minimize food waste. The device may or may not be in communication with the refrigerator, freezer or other remote electronic device. Certain embodiments may have sensors that detect spoilage or the like via change in heat or presence of bacteria etc.

Rather than a snap-able lid the lid described herein will we slid-able. Meaning it will insert into the top part of the body. The lid will also include an indented handle for means of gripping (sliding in and out of the body). The lid will have the ability to slide into either the front, back or side of the container.

The display screen that will entail a timer will also be slide-able. It will slide into the front of the container and be held secure by a snap-able button. This will ensure the containers are both stackable and dishwasher safe. Stackable because the embodied display will be on the front or side of container and not on the lid. Dishwasher safe because the display is detachable so container and lid can be washed while display set aside. The containers will come in multiple shapes and sides including square, rectangular, circular, and triangular. There will be no limit on the dimensions in regards to how large or small.

There are other possibilities for the timer including having one that is built into the lid. This would mean the lid and display would need to be water resistant for the dishwasher. Another option would be to have the insert be on the lid rather than on the container; so the display would be attachable and detachable from the lid.

The primary function of the display is to monitor the time to ensure freshness. There are a few different ways to go about tracking the time. The first way is to have the timer count the day as it is displayed on the screen. The second is for the display to simply track with lights to indicate freshness. The consumer can do this by selecting the date the food is being stored and the date in which they wish to discard the food by. For example if it is June 23rd and they wish to have the food for three days; the consumer will select an in date of June 23rd and an out date of June 26th. By pressing start it will generate a 72 hour time window and alert the consumer when that time has been reached. The display may also be color coated indicating time frames. When there is more than 48 hours on the lock the display screen will be green, when time gets below 48 hours screen will turn yellow, and when time drops below 24 hours, screen will turn red. This is just one option. There may or may not be any colors associated with the display screen. Any colors used are not limited to red, green and yellow. In addition to there may be flashing lights on the display or a sound alert of any kind. When full 72 hour time frame is reached the consumer will be alerted by their blue tooth and/or an alert on the display screen reading "Toss Me" or a phrase of the like. This example can be applied to any unit of time: one day, three days, four days, five days, six days, seven days, etc.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

Alternatively, rather than having the entire display screen turn green, there may be three buttons at the bottom of the timer. The first green, second yellow, and third red. When there is more than 48 hours on the lock the first button will light up green, when time gets below 48 hours the second button will light up yellow, and when time drops below 24 hours, the third button will light up red. Or there may be no color change associated with the time lapse and the display screen could remain one color the entire time.

Alternatively, rather than having the timer slide in from the top of the insert, it may slide it from the side. See FIG. 10

An alternative to the selecting time on the timer may to be have arrows pointing up and down where one can select the amount of days of their choice.

The display may include but is not limited to the following: A digital screen for the timer with arrows controlling the desired time. The display for the timer may or may not include the temperature. There may be a separate digital screen that displays a food label. There may or may not be arrows to go backwards or forwards to select the desired food or phrase. There may be a power button designated just for the food label screen. There may or may not be an indication of battery life on the display. Different ways of doing this are described herein but are not limited to these methods.

The lid will have the ability to slide into either the front, back or side of the container. The containers will come in multiple shapes and sizes including square, rectangular, circular, and triangular. There will be no limit on the dimensions in regards to how large or small.

The lid will slide into the container from the front, either side or the back. The lid may or may not have an indent for hands.

The timer will slide from either the top, the bottom or from either side of the display holder. It will possibly be held in place by sliding rails or a snap-able button or any other means of secure holding method. Alternatively the timer/display may snap into place on the front or side of the container rather than sliding. It will do this by having a button on the back of the timer that locks into place with the container.

The food label may be beneath the timer itself or anywhere on the display. If digital, the label will have a power button and arrows to select the desire option. The options are not limited but may include choices such as meat, fish, dairy, fruit, veggies, left overs, or any other food group or individual food. The food label will have the ability to or not to connect to the timer. For instance, it the timer and label are connected there will be a pre-determined amount of time for each food option. If the consumer chooses fish then perhaps the time will auto select to three days, if the consumer chooses fruit perhaps it auto selects five days. The time can be adjusted (up or down) by the consumer. On the other hand, the food label may stand alone from the timer. In this case, the consumer could choose fish and then would manually select their desired time lapse (i.e. three days, four days, etc.)

If not digital, the food label could be a turning round about bout. Similar to that on a lock. There could be several different options and the consumer would select their desired choice.

Or there may be no food label at all and the entire display is simply the timer.

The containers will either be glass or plastic. They may either be clear and transparent or be tinted color. If tinted, they will be see through, similar to that of stain glass. It may be color coordinated to the lid or not. So if the lid is purple, the then container may be light see through purple or any other color.

The lid will seal in the container and be air tight to preserve freshness. One option could be that at the back of the container there is a snap-able button. So when the lid is slid into the body of the container and reaches the back, it snaps into place. The container could also be air tight by having the snap button a the front of the container. There may or may not be rubber lining to help seal the lid to the container to make it air tight.

There may be a feature on the display screen of the timer that reads the time that has lapsed so the consumer is aware when the food has been placed in the container. For example, in the upper left hand corner, or anywhere on the display screen, will read the time that has passed. Time lapse may be in either days or hours.

When the time is up the words across the screen are not limited to "toss me" but may include TIME UP, TIMES UP, TOO LATE, EXPIRED, ALL DONE, END, or any other single word or phrase to convey this message. In addition to the words there may be flashing lights on the display or a sound alert of any kind.

In addition to food groups or individual foods the label may or may not serve as a means of message or reminder such as "use first, eat first, leftovers, your favorite" etc.

There may or may not be an indication of time lapse in addition to time remaining. This may appear on the same screen, in one of the corners. There may or may not also be an option to have the time lapse on a different screen. For instance, there could be a button on the side of the screen to change screens. When the button is pressed it will change from the main time remaining screen to the time lapse screen. The purpose of time lapse is to inform the consumer how long the food has been in the fridge, in addition to how much time it has left.

Somewhere on the display, either above, below, or to either side of the timer/food label there may also be three dots that have the ability to light up. The first dot will be green, the second yellow, and the third red. These dots will serve as communication to the consumer. They may coordinate with the time remaining. The lights may or may not flash or make a sound alert of any kind. For example, if the time left is greater than three days, the light will be green, if less than 2 days the light will turn yellow, and if less than one day the light will turn red. These are not exact time frames and may change.

Alternatively, there may just be one dot rather than three. This one dot will change color the same way. It will serve as communication to the consumer. They may coordinate with the time remaining. For example, if the time left is greater than three days, the light will be green, if less than 2 days the light will turn yellow, and if less than one day the light will turn red. These are not exact time frames and may change. In addition to the words there may be flashing lights on the display or a sound alert of any kind.

The indent referred to on the lid is for easy insertion and removal of the lid from the body of the container. It may or may not be present on the lid. It is possible to have a flat lid.

The display may be battery powered. If the display is battery powered, it may contain a battery or batteries. The batteries may be changeable through an entry on the back of the display.

The display may be chargeable as opposed to or in addition to battery powered. If battery powered, the container may come with (or sold separately) a charger. The charger may hold a single display or several (between 3-5). The charge base may be either vertical or horizontal.

The battery display may be digital which could give an alert such as "low battery, power low, plug me in or charge me." In addition, the display screen could have 'bars' that indicate battery life. The fewer the bars, the lower the life of the battery.

Alternatively there may be lights that serve as indicators for battery life. There may be one dot that changes colors or may be three dots that go from one color to another. For instance when the battery life is good the first light will be green and the rest will be unlit. It will move to yellow and then to red as the battery life lessons. When it moves from one color to the next, the other lights are not lit up. The colors may include green, yellow, and red or any other variation or sequence of colors. The lights may or may not blink and there may or may not be a sound alert. There may or may not be a battery symbol illustrating that the light represents battery life or duration.

Another way could be to have there be a battery symbol and there may be a single light that changes colors to indicate battery life. The colors may include green, yellow, and red or any other variation or sequence of colors. It will move to yellow and then to red as the battery life lessons. The single light does not have to be accompanied by a battery symbol. The light may or may not blink.

It's important to not that the battery display may be anywhere on the housing display, though illustrated in the pictures being in the upper right corner, it is not limited to this position and may be anywhere on the display.

Rather than being on the front of the container may be insertable in addition to or instead of the lid. The lid may contain an indent that fits the display so that the display sits within the lid and does not rise above. This would ensure that the containers where still stackable. The lid may or may not still have 'rails' that the timer slides into to keep it into place.

Though the primary reference of this invention has been that the display would insert into a food container. There is also the possibility that it could attach to a resealable bag and act the same way.

The timer is described mostly as an insertion to a food container but it can also be a stand alone product and attached to many different items.

Illustrated in the pictures below, the display is rectangular but it is not limited to that shape or any particular size.

BRIEF DESCRIPTION OF THE DRAWINGS

The figures which accompany the written portion of this specification illustrate embodiments and method(s) of use for the present invention, food storage container system, constructed and operative according to the teachings of the present invention.

FIG. 21A-B shows how the display may slide in from the side of the housing,

The various embodiments of the present invention will hereinafter be described in conjunction with the appended drawings, wherein like designations denote like elements.

DETAILED DESCRIPTION OF THE INVENTION

The present invention is directed to containers for safe food storage. In one embodiment of the present invention, food storage container systems may comprise food storage container assemblies having cuboid shapes. In an alternate embodiment the shape of the food storage container assemblies may comprise a cylindrical shape. Other shapes may be used; however the cuboid and cylindrical versions have been shown herein for enablement purposes and the present disclosure is not intended to be limited to those described.

Figure 1:
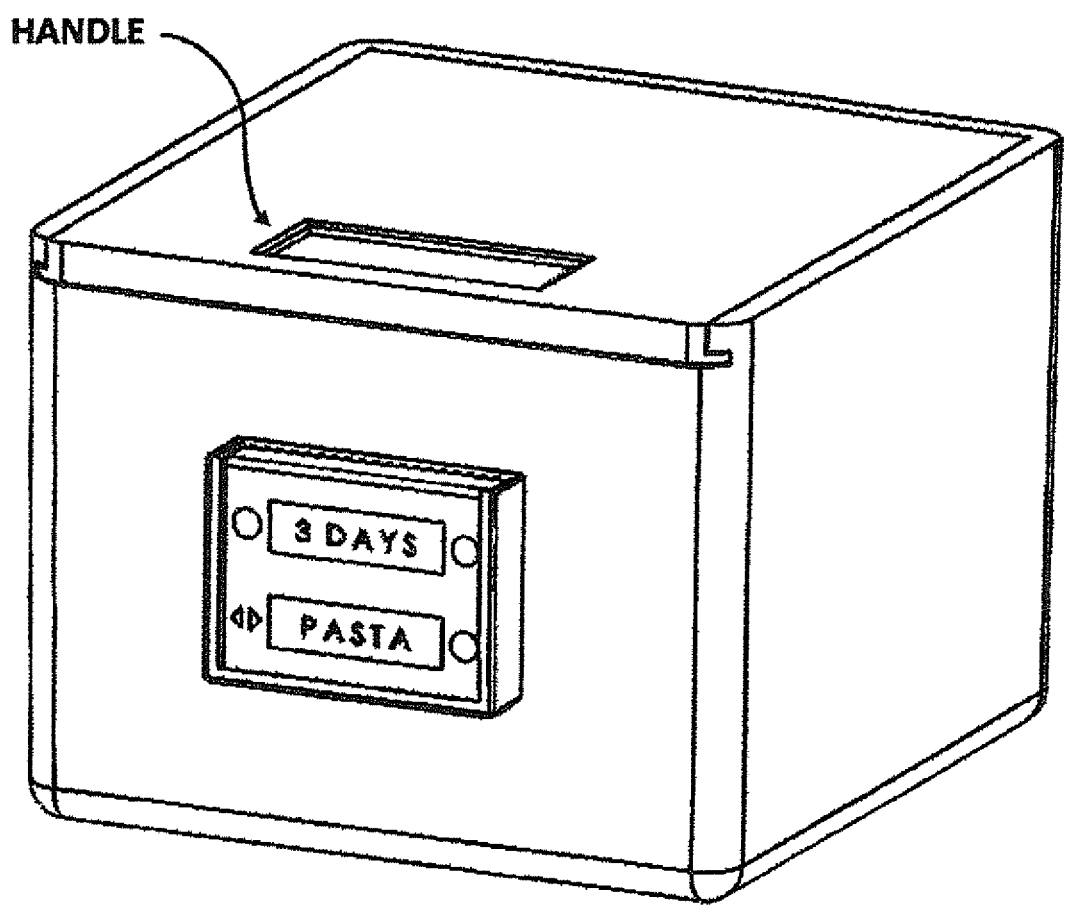
FIG. 1 is a perspective view of a food storage container system during an 'in-use' condition according to an embodiment of the present invention.

Referring now to the drawings, there is shown in FIG. 1 a perspective view of a food storage container system during an 'in-use' condition according to an embodiment of the present invention. The present invention is designed for use with refrigerators and freezers and other means for maintaining cool temperatures for food. The product acts as a food containment means by effectively sealing the food stored within from the ambient environment. Certain embodiments may comprise gaskets or other sealing means. Other embodiments may comprise means to evacuate air from the food storage container assembly.

Figure 2:
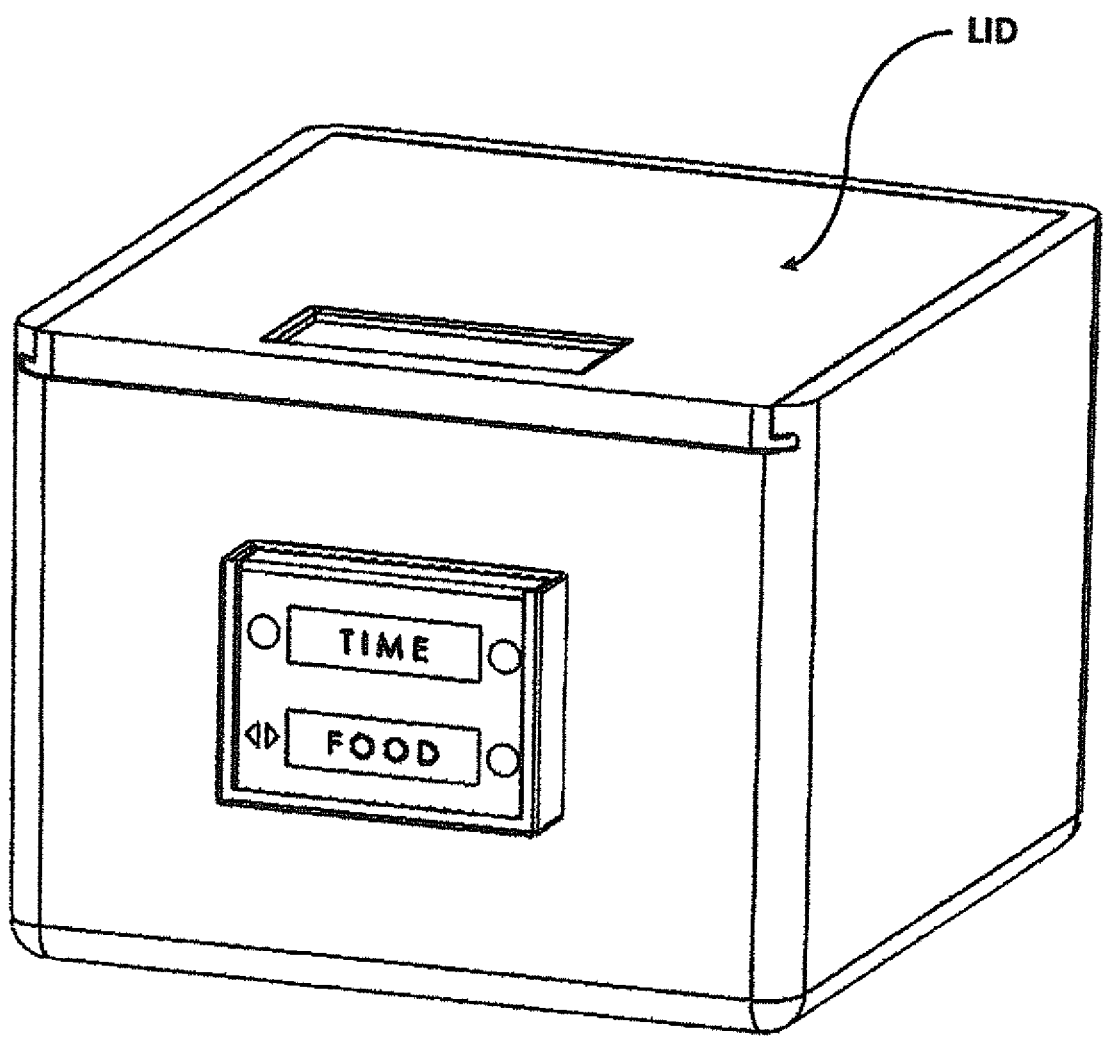
FIG. 2 is a perspective view illustrating a cuboid version of a food storage assembly (container and lid) of the food storage container system according to an embodiment of the present invention.

FIG. 2 is a perspective view illustrating the food storage assembly (container and lid) of the food storage container system according to an embodiment of the present invention. The lid may comprise an indent that can act as a handle to push and pull out the lid. Or an external handle entirely. The lid is able to be sealingly coupled to the container. The lid may slide in relation to the container in certain embodiments rather than latching to the top edge. The cuboid version is shown in the present figure.

Figure 3:
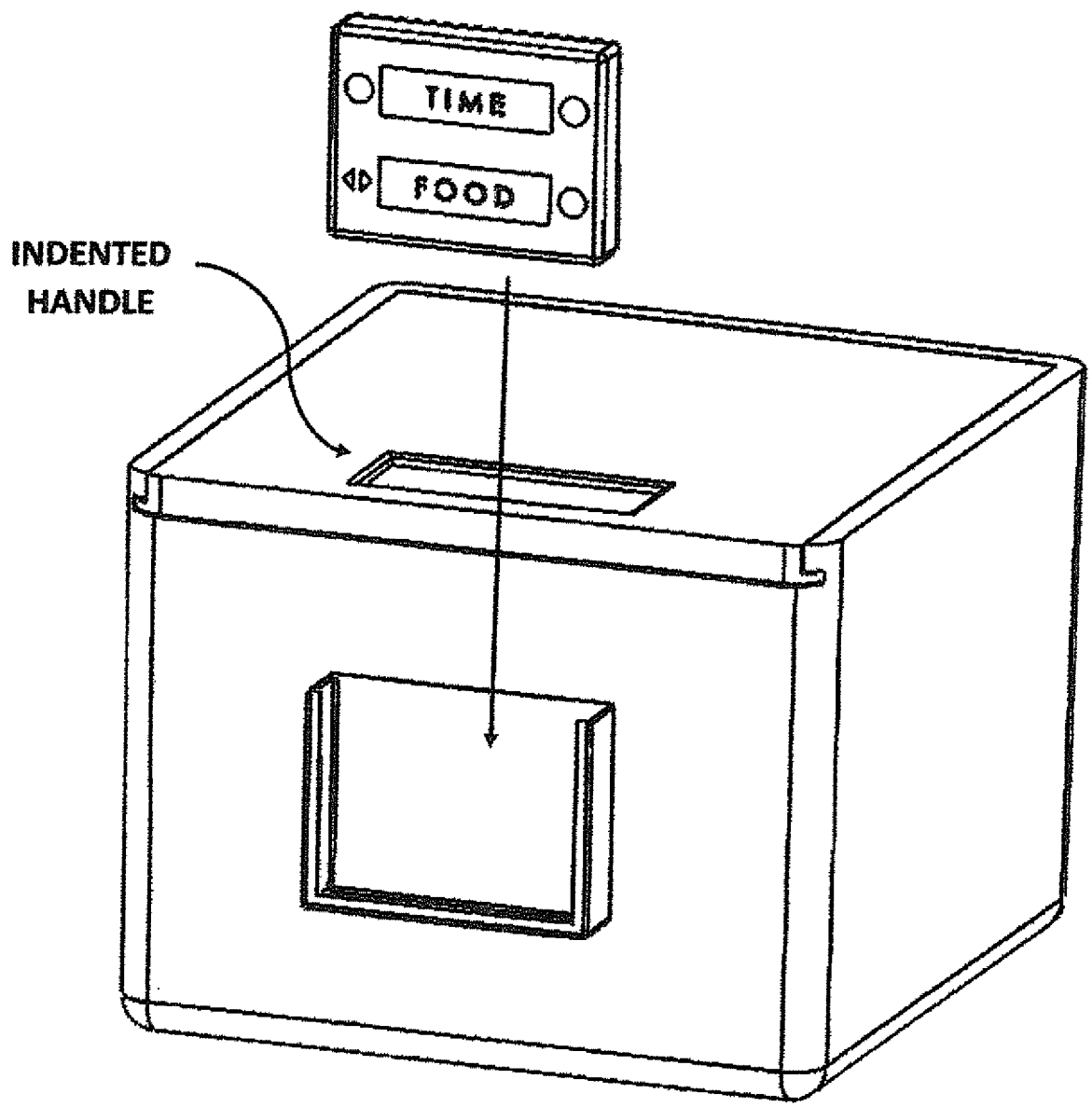
FIG. 3 is a perspective view illustrating one perspective of how the timer inserts into the front of the container system according to embodiment of present invention. Allowing the containers to be stackable.

FIG. 3 is a perspective view illustrating how the display with timer slides into front of the container. There are two rails on the front of the container that allow the display to slid into place. It is held into place with a snap button that can be pushed to release the display.

The present invention acts as a food storage containment means designed to track how long food has been stored. A timer may count up to the desired time or down, depending on user preference. The timer and label are sealed such that they are dishwasher-safe. The timer may comprise lighting means such that the face and or indicia displayed thereon may be colored. For example when there remains 72 hours or greater on the timer, the display screen will be green, when 48 hours or less the timer will turn yellow, when time reaches 24 hours or less the timer will turn red. After that time the color may turn red as an indicator that the food is no longer suitable for consumption. This relative timing may be based off of what food is stored therein and how the food was prepared etc.

Figure 4:
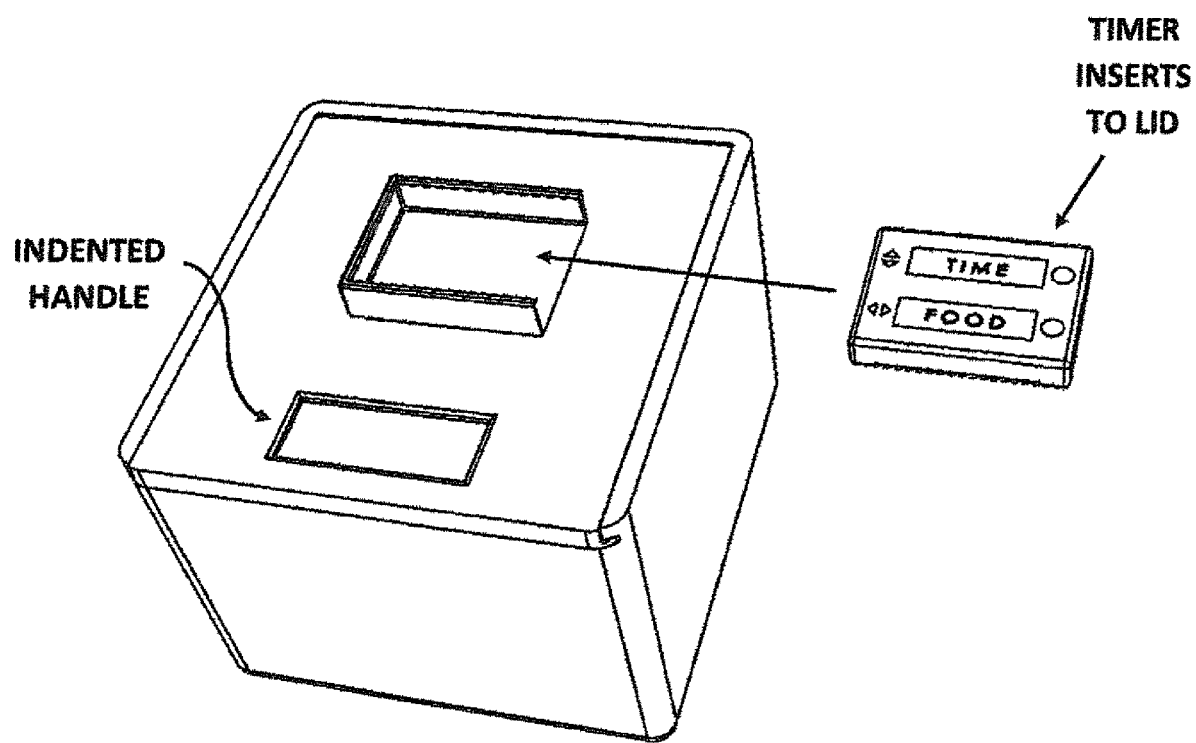
FIG. 4 shows another option for inserting the timer into the lid rather than the front of the body.

FIG. 4 shows a perspective view illustrating a display and indicia on a container assembly of the food storage container system according to an embodiment of the present invention. An option to have the display insert into lid rather than container.

As shown (see Addendum one and two for further clarification) the device may contain an integral timer or a mounted timer (that can be added to the lid). The timer may comprise a display screen that shows a digital or non-digital display of time. Time displayed may be in time increments of years, months, days, hours, minutes, and/or seconds. The display screen may include a calendar where the consumer The display may also show temperature reading(s) in Fahrenheit, Celsius or other. Further, the display may show via a color-coded color (example green, yellow or red) as an indication of the time left where the comestible is 'good' (suitable) for consumption.

The user may input the start-time when the food is first stored as well as what kind of food is stored (eg. poultry, red meat, fish, pasta, and the like). A label may be used for displaying indicia related to the stored item. In preferred embodiments the label and timer are located on or integral with the lid; however certain embodiments may be positioned such that the label and timer are located on or integral with the container. The timer and label are in electronic communication with the microchip and powering means. Sensors may be used to sense temperature and the like. The exact specifications, materials used, and method of use of the food storage container system may vary upon manufacturing.

Figure 5:
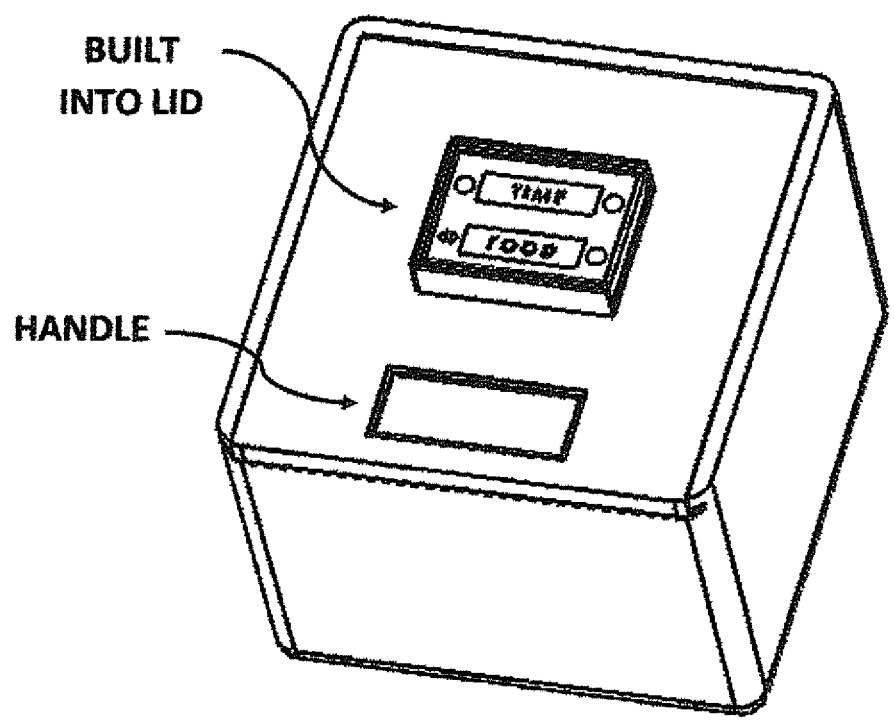
FIG. 5 shows how the timer could be built into the lid and waterproof rather than attachable.

FIG. 5 Shows how the display could be built into the lid and be water proof. FIGS. 3-5 show different options for attaching display to embodied invention.

Figure 6:
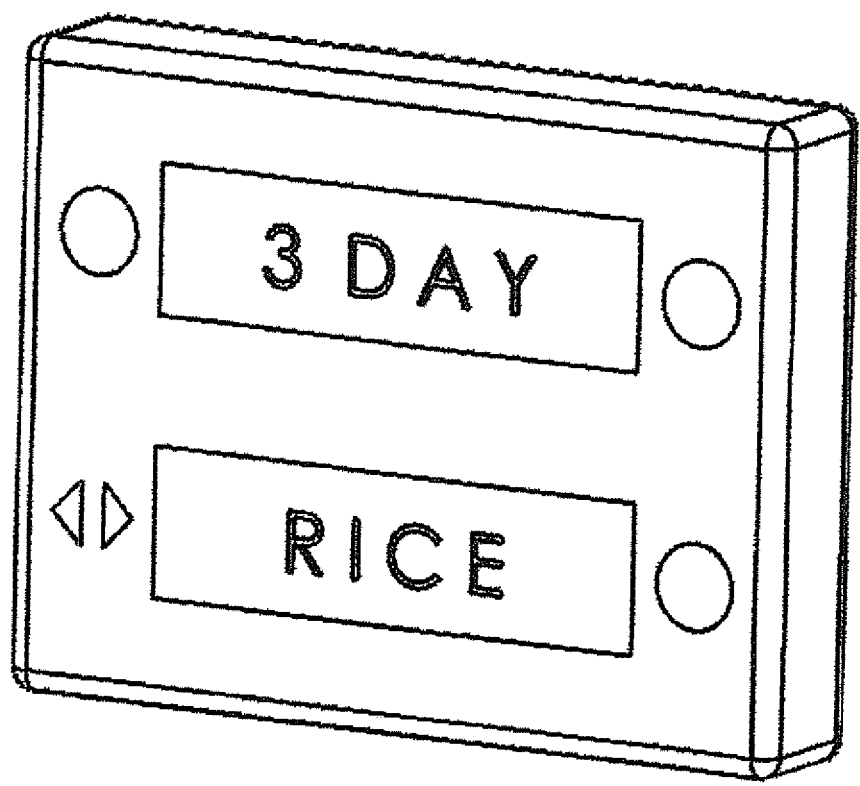
FIG. 6 shows a perspective view illustrating a display on a container assembly of the food storage container system according to an embodiment of the present invention.

FIG. 6 Shows The display of timer in detail. It entails a date in time, date out time, and time remaining or time that has lapsed in either hours and days and hours. The display will also include the temperature as well as possible a label allowing consumer to choose food type.

Figure 7:
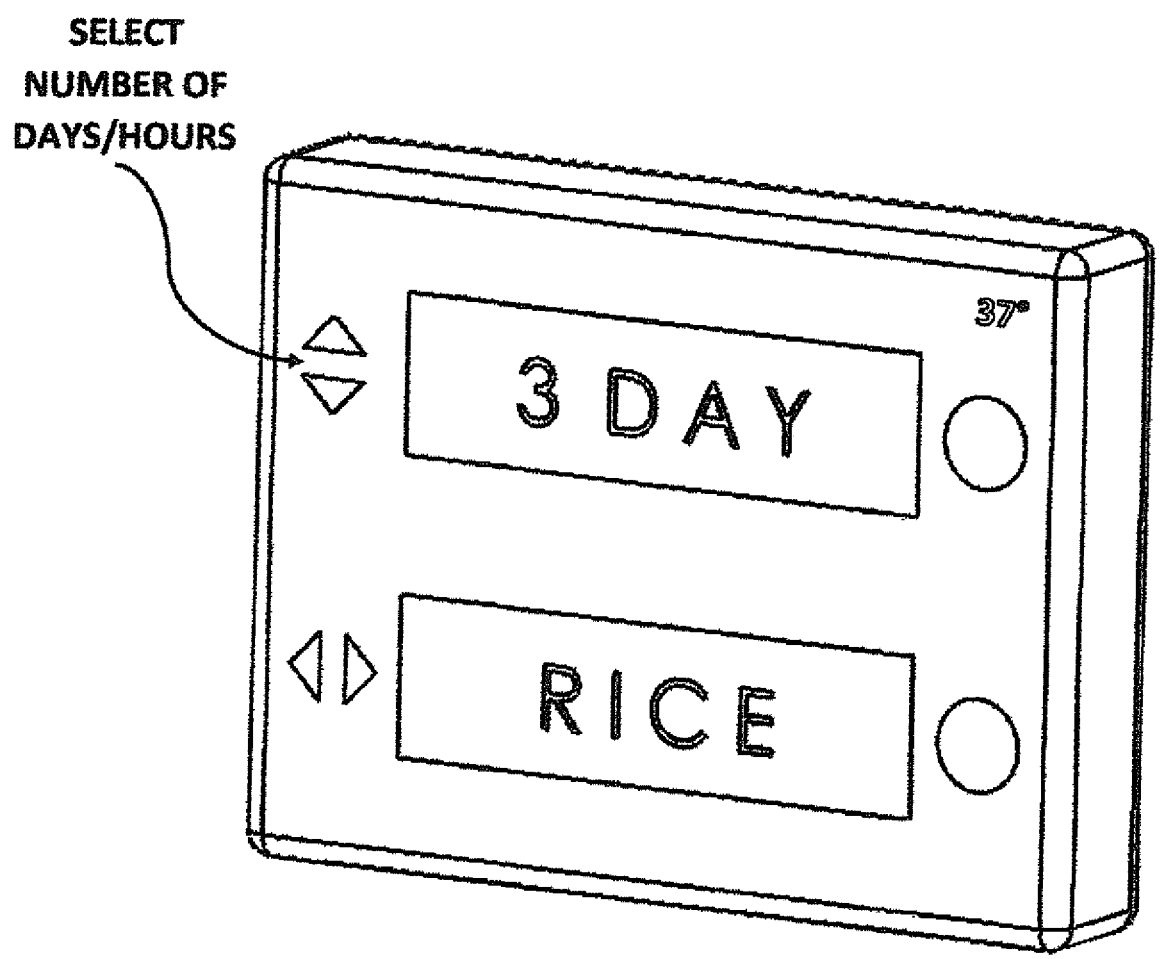
FIG. 7 shows an alternate approach to the timer. On the display the consumer would be able to select the amount of days and hours they wish to keep their comestibles. Example 3 days, 0 hours. It may or may not contain the temperature. It may or may not include the food label. This display may be used in "in use" drawing for FIG. 1.
Figure 8:
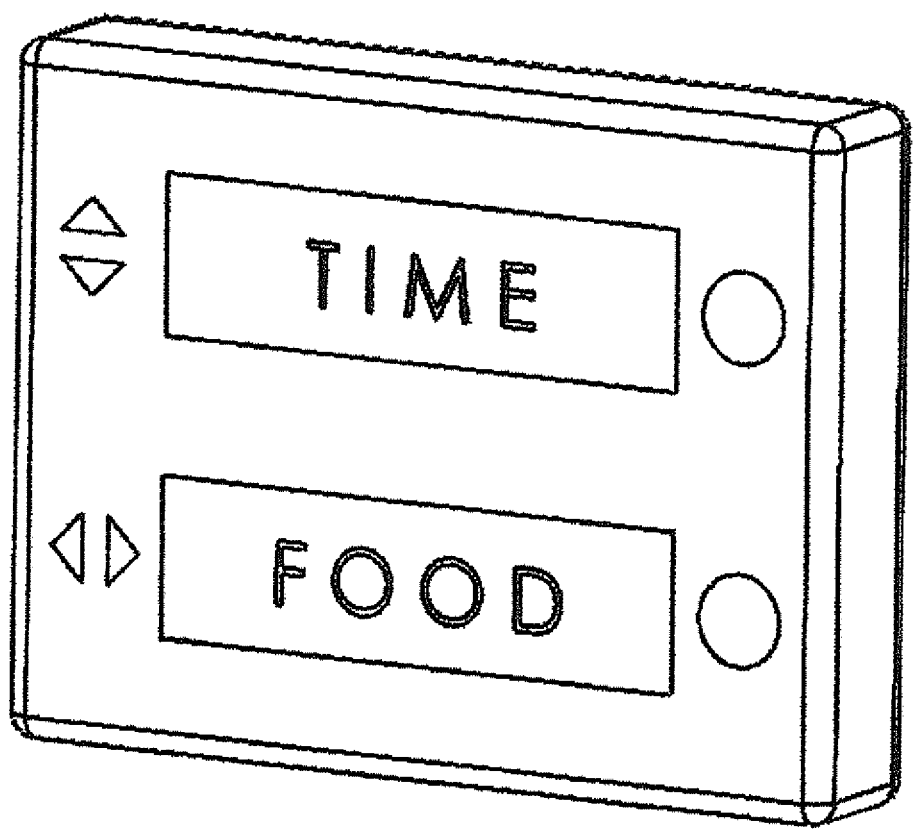
FIG. 8 shows is a perspective view of the timer for the food storage container system according to an embodiment of the present invention.
Figure 9:
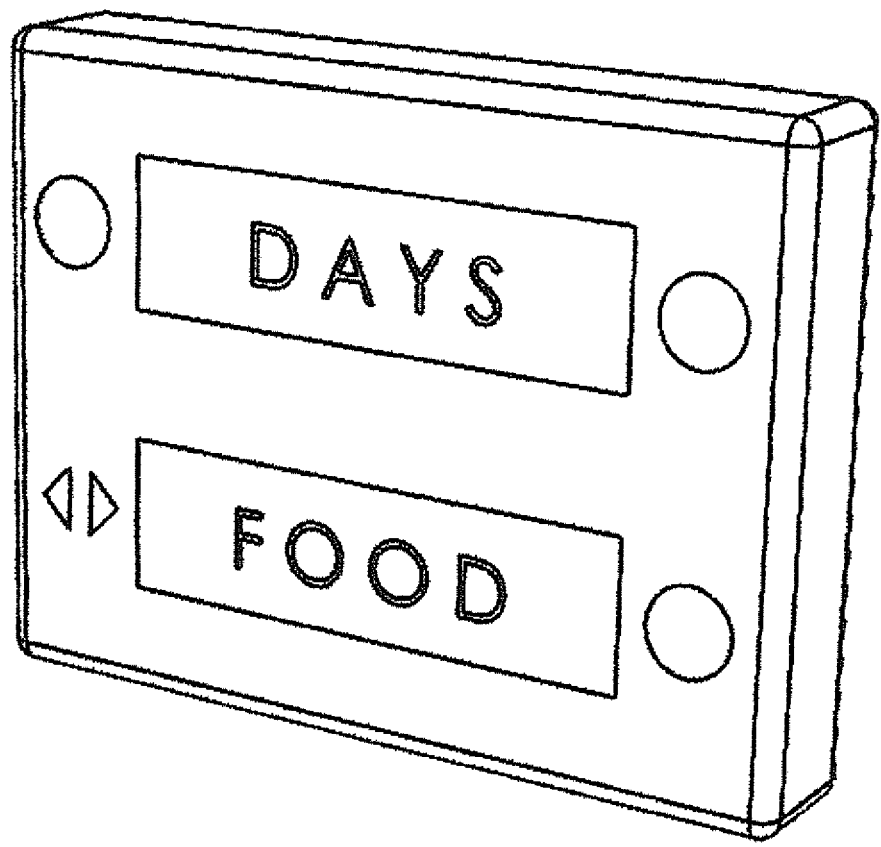
FIG. 9 shows is a perspective view of the timer for the food storage container system according to an embodiment of the present invention.

FIG. 7 shows how consumer may be able to select a certain number of days with the up/down arrows, whereas FIG. 8 shows an option to just have a power button on the display that will count days beginning at day 1.

Image 9 shows the light indicators that may be present on the display rather than having the digital screen light up. The lights will indicate to the consumer how long the food has been in the stored container.

Figure 10:
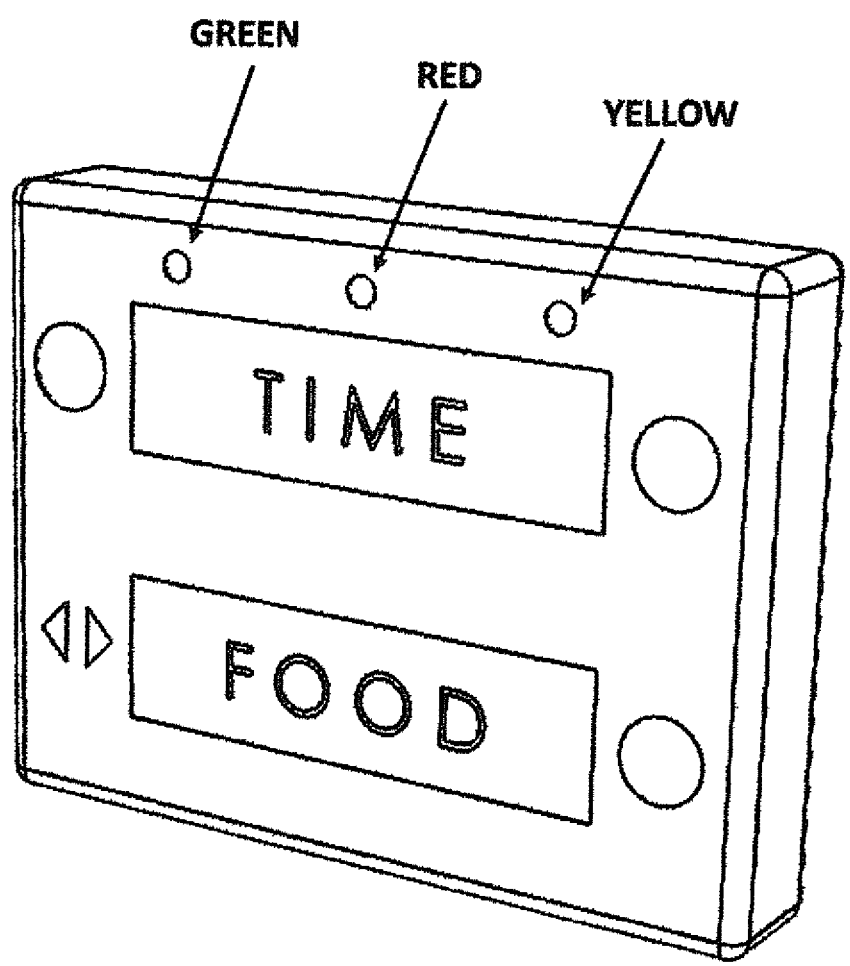
FIG. 10 shows an example of the timer displaying lights.
Figure 11:
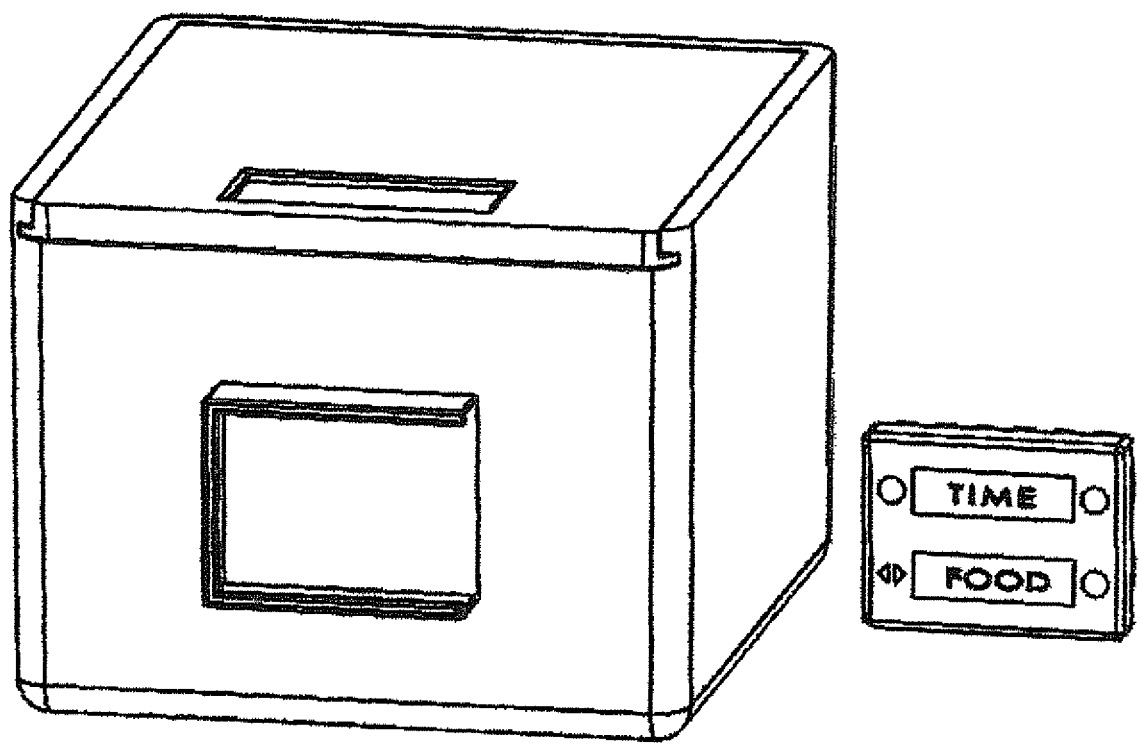
FIG. 11 shows how the timer may enter from the side rather than the top.

One of the main components of the container system is that the timing display can slid into the container as in FIG. 10. It will do this by having rails on the container and the display to connect the two.

Figure 12:
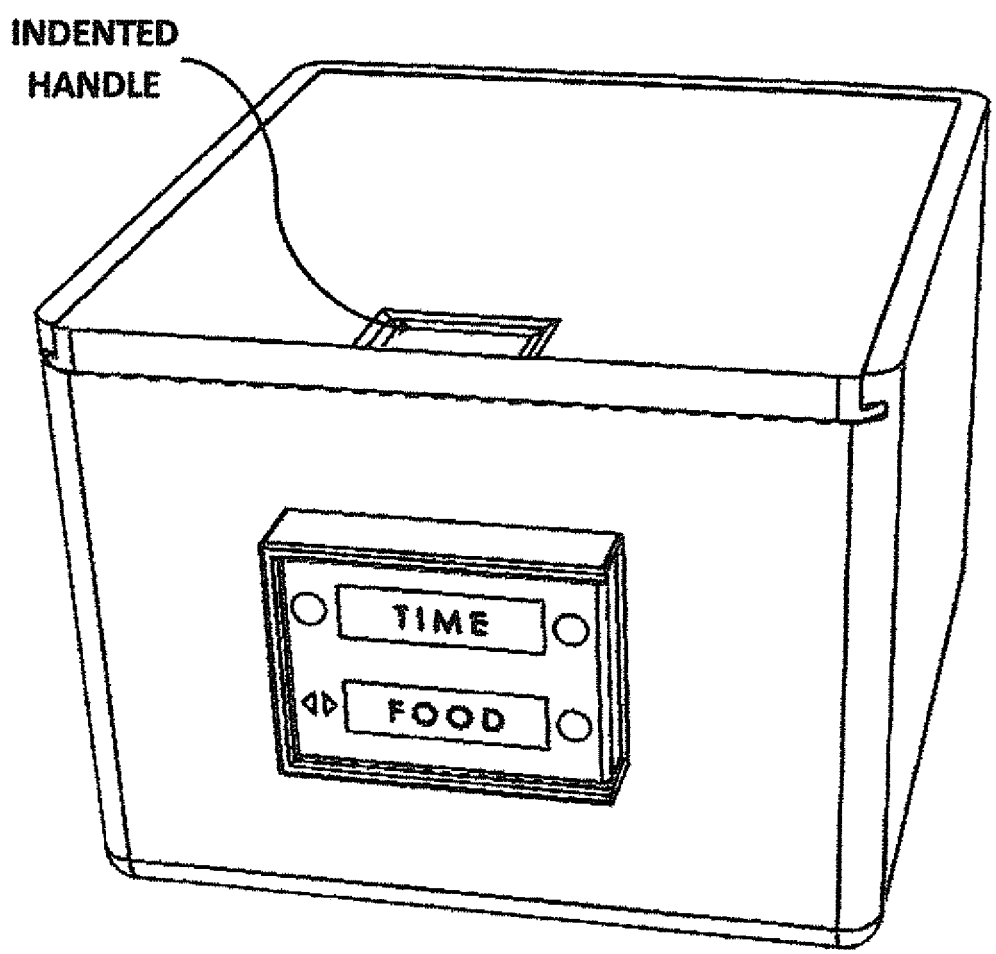
FIG. 12 shows the that the container may be square.
Figure 13:
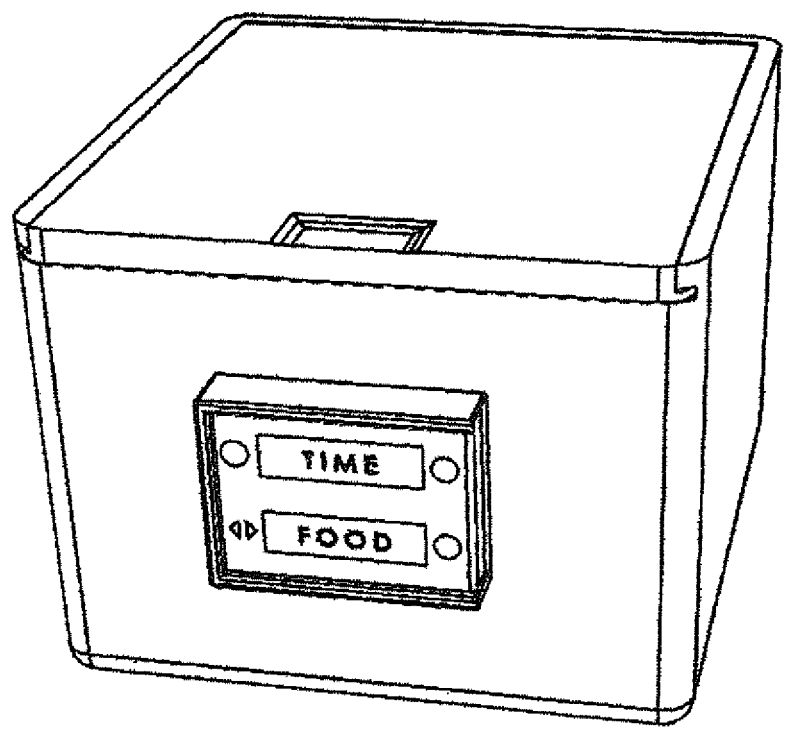
FIG. 13 shows the container may be rectangular.

FIG. 12 shows that the lid of the container may have an indented handle that will allow for the consumer to easily side in and out of the container. It will then latch into place, sealing airtight.

Figure 14:
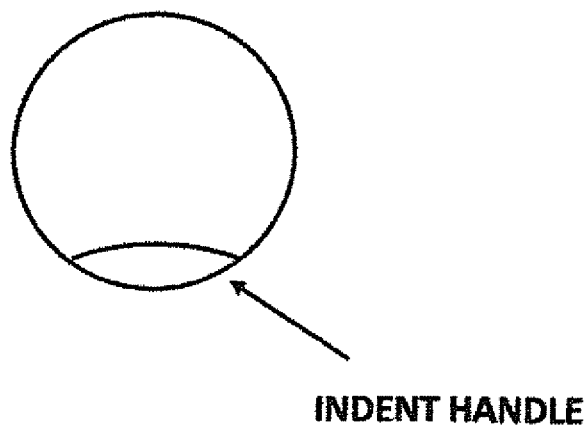
FIG. 14 shows the container may be circular.
Figure 15:
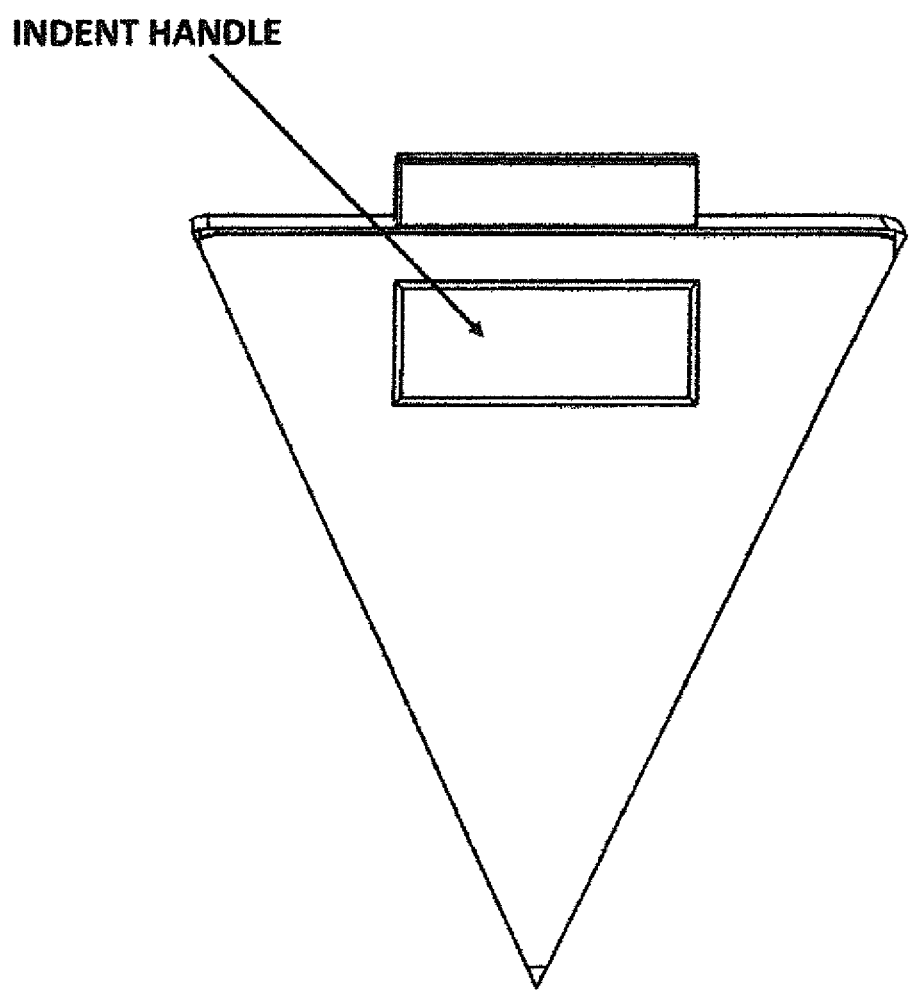
FIG. 15 shows the container may be triangular.

FIGS. 14 and 15 show how the container can take different shapes such as circular or triangular.

Figure 16:
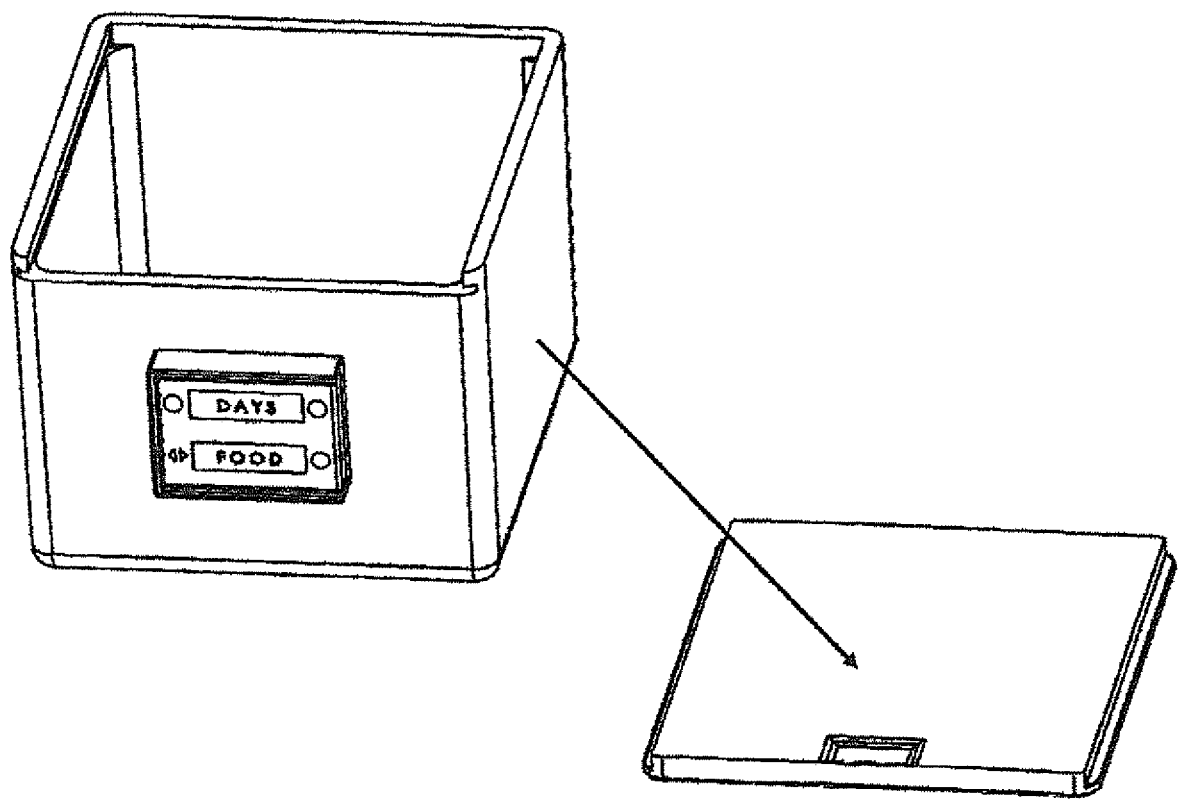
FIG. 16 shows that lid may slide in from the front of the container.
Figure 17:
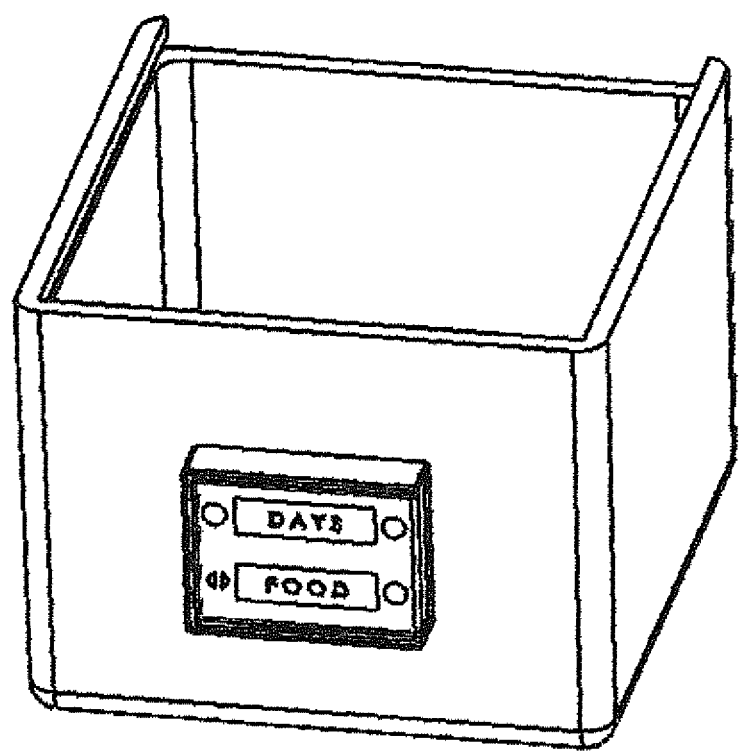
FIG. 17 shows that container may slide in from the back of the container.
Figure 18:
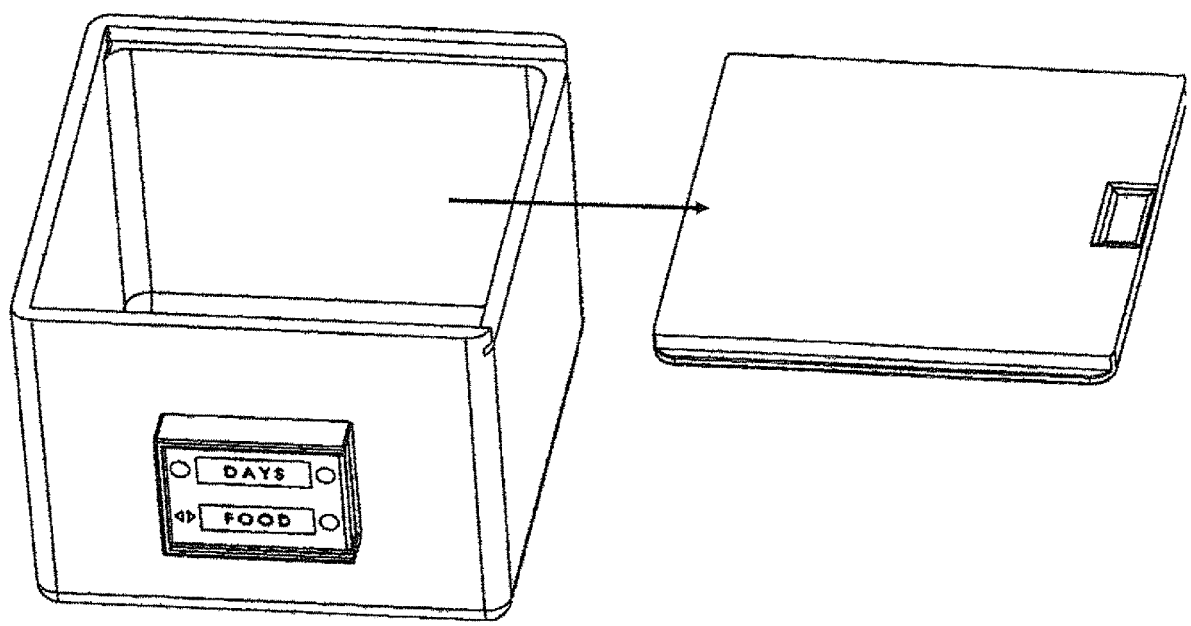
FIG. 18 shows that the lid may slide in from the side of the container.

There may be options for the lid to slid in from different angles of the container such as the side, front or back, see FIGS. 16-18.

Figure 19A:
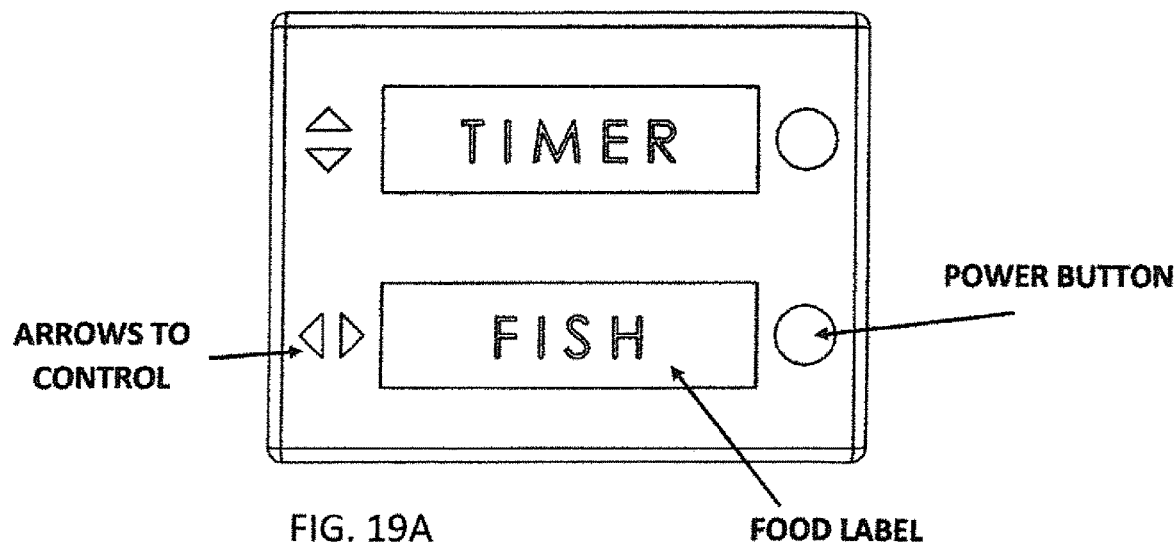
FIG. 19A shows one embodiment of a digital label screen on the display. It will have its own power button along with controls to scroll backwards or forwards. The digital screen for the label may include an unlimited amount of food choices/groups along with individual phrases including "Use First" or "Take Out". It will have it's own power button on either side and have it's own arrow controls to scroll through the food choices, set of arrows could be on either side of the food label.
Figure 19B:
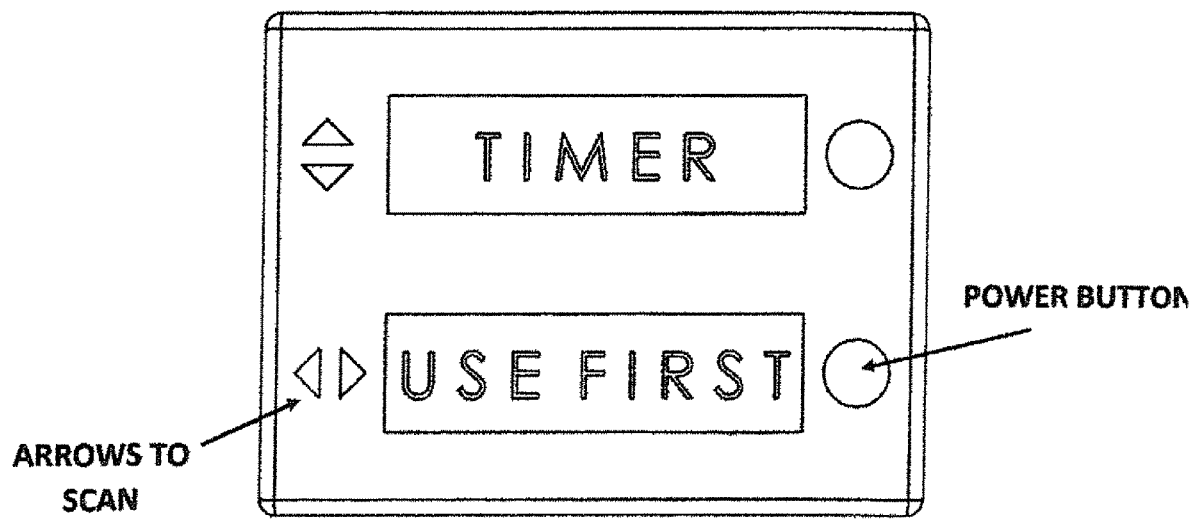
FIG. 19B shows one embodiment of the digital label screen on the display.

There may be an option on the display to have a digital component that shows the contents of the container. FIG. 19 shows how the arrows will be used to select from an unknown number of options.

Figure 20A:
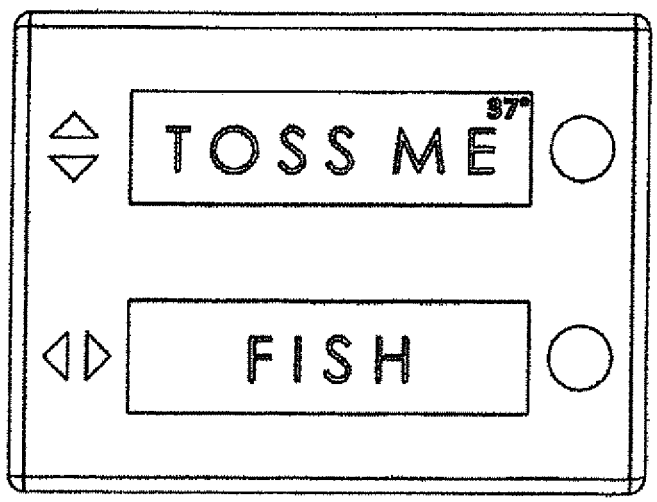
FIG. 20A-C shows examples of same of the readings that may appear when the timer reaches zero.
Figure 20B:
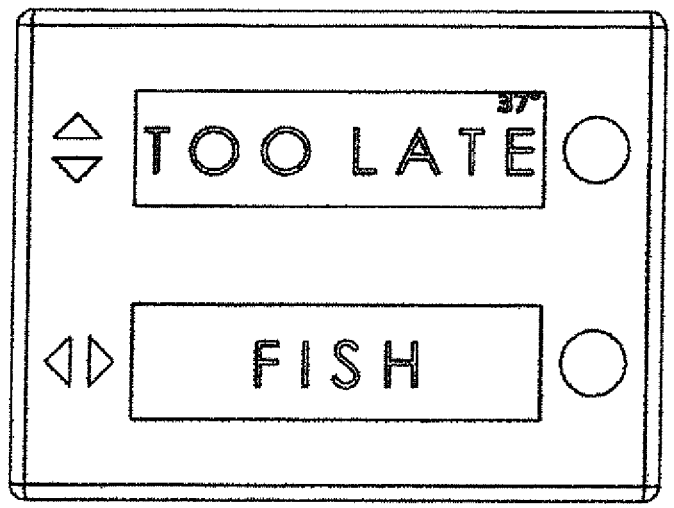
Figure 20C:
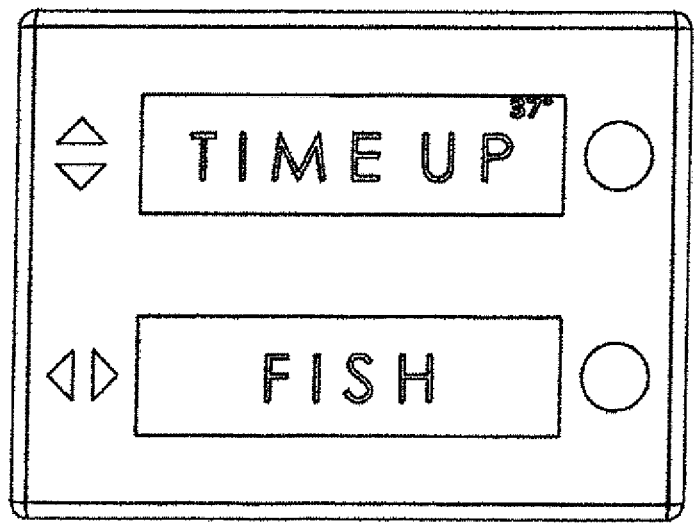
Figure 22:
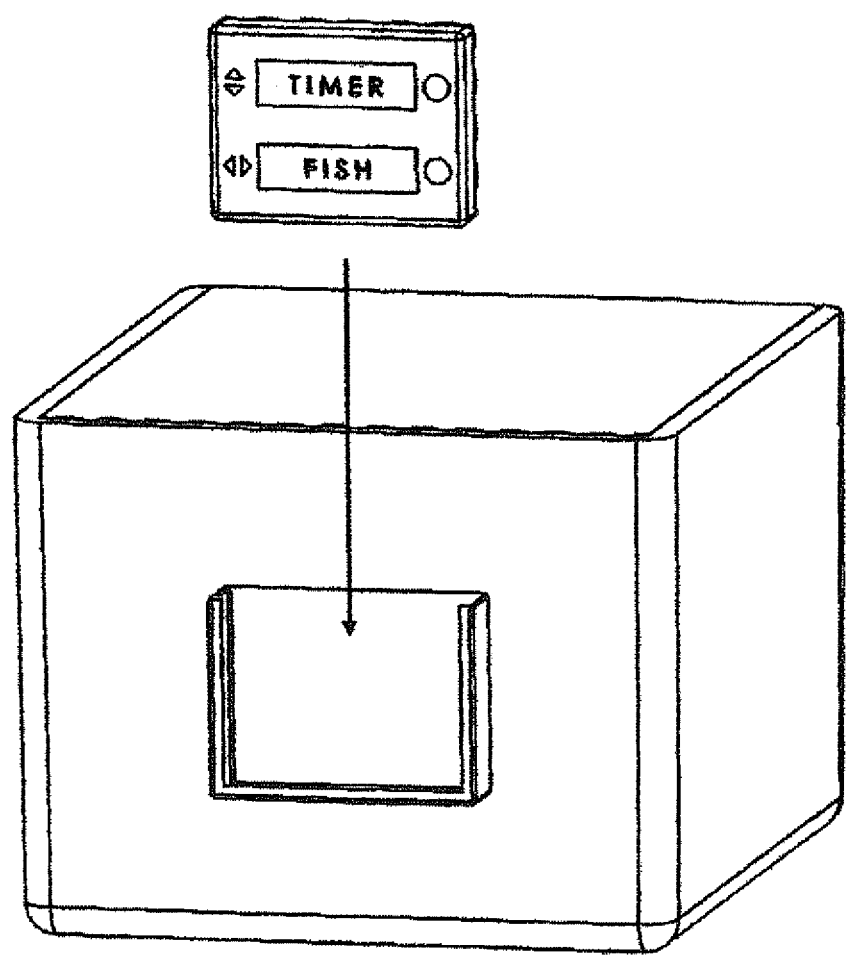
FIG. 22 shows how the display may slide in from the top of the housing.

There is an option on the digital display where the days are counted for there to be a word indication that the food is now expired, see FIG. 20. FIGS. 21 & 22 display how the display may be inserted from multiple different angles.

Figure 23:
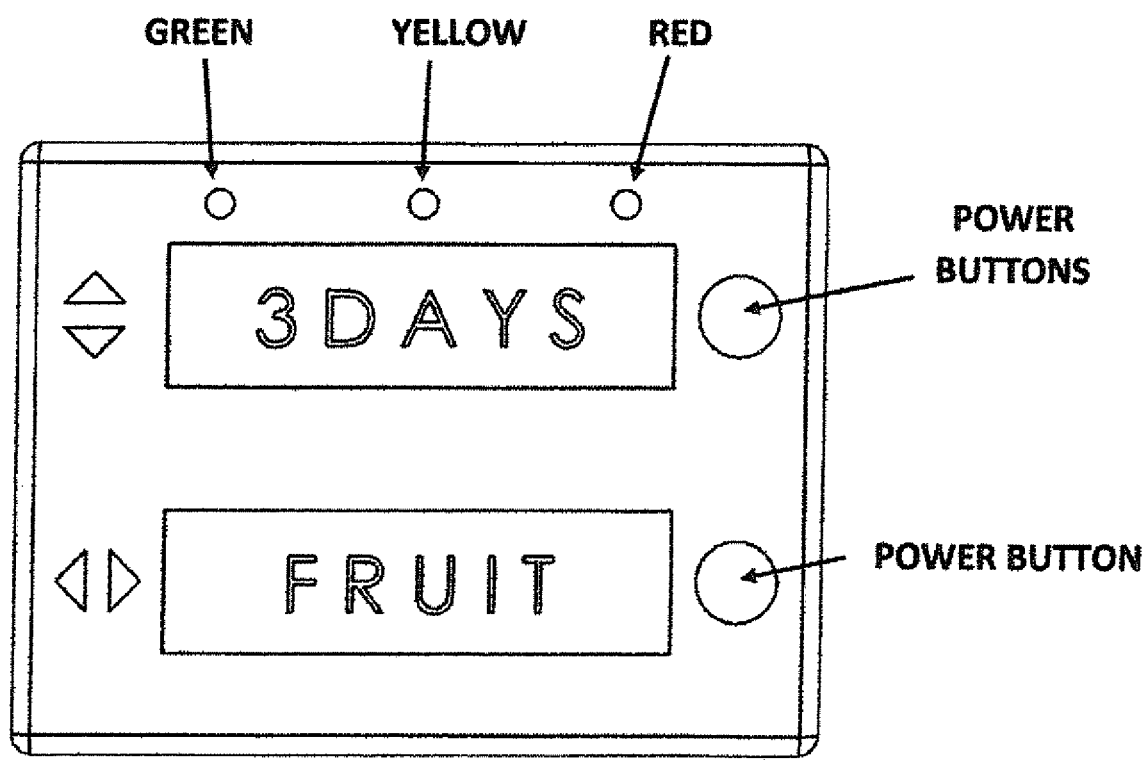
FIG. 23 shows the lights coordinating to the time lapse. There may be three, one green, one yellow, and one red.
Figure 24:
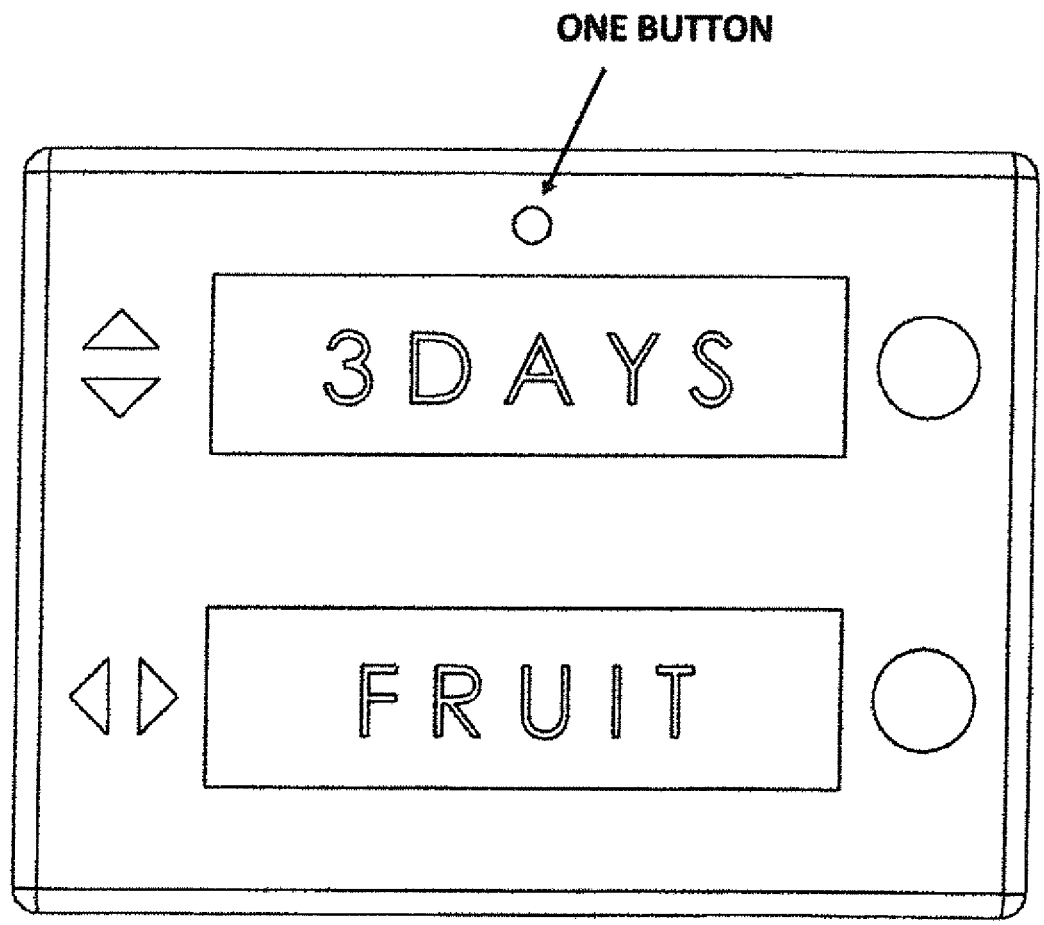
FIG. 24 shows there may be only one light that changes from green, to yellow, to red as the time progresses.

It is noted in FIGS. 23 & 24 how there can be numerous lights that each have their own color. For instance, the green lights up first, then the yellow followed by the red as time progresses. There is an option as well for one light that changes colors.

Figure 25A:
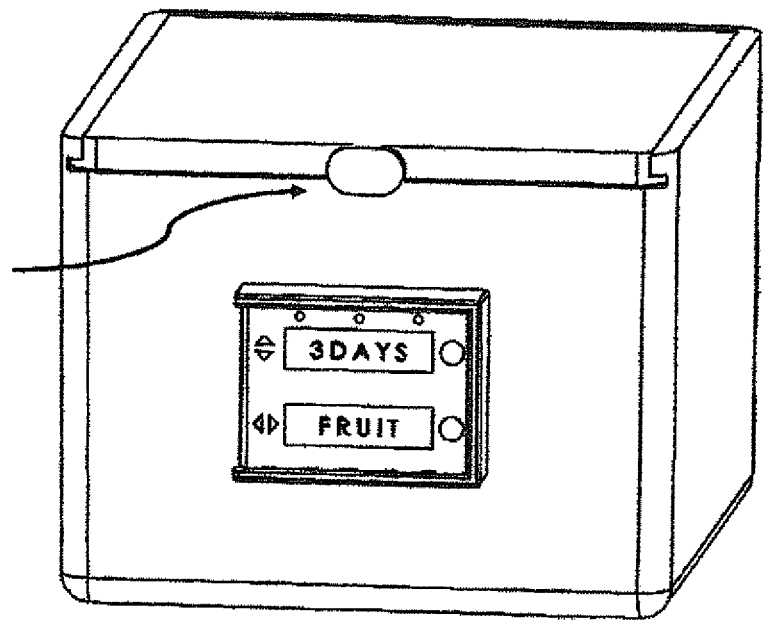
FIG. 25A-B shows that there may be a snap-able button that locks in the lid. It may be any shape including circular, square, or rectangular.
Figure 25B:
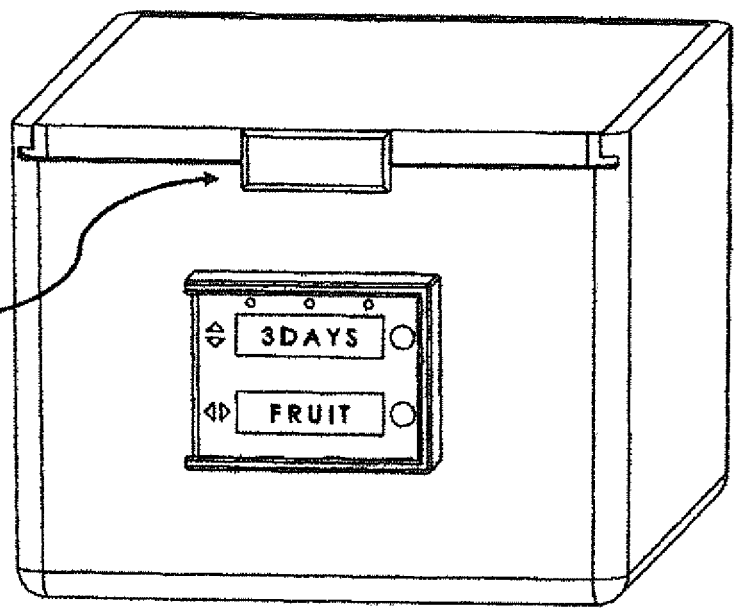

It is important that the lid lock into place for freshness, FIG. 25 shows a lock and release button on the front of the container. This snaps into place when the lid is slid into place and when the button is pressed it allows the lid to unlock and slid off.

Figure 26:
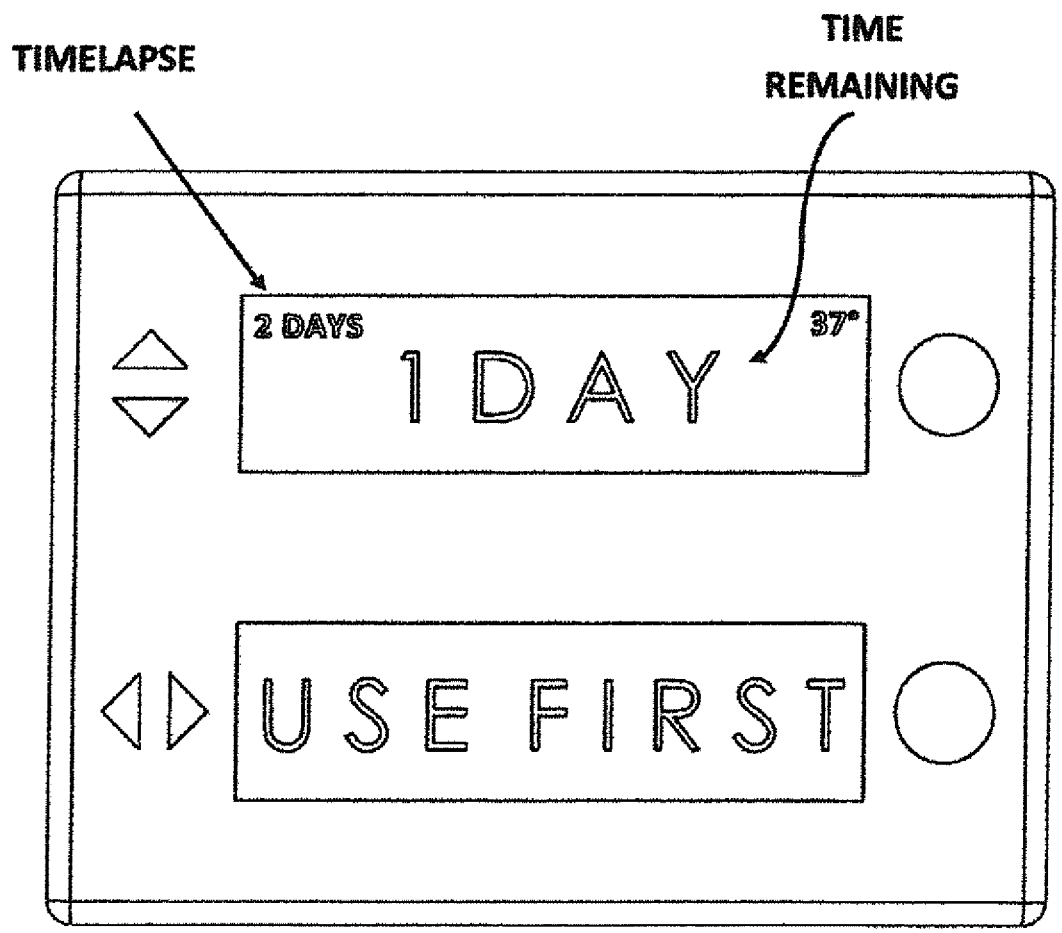
FIG. 26 shows that the timer on the display screen may have an option where it shows the time that has lapsed, along with the time remaining.
Figure 27A:
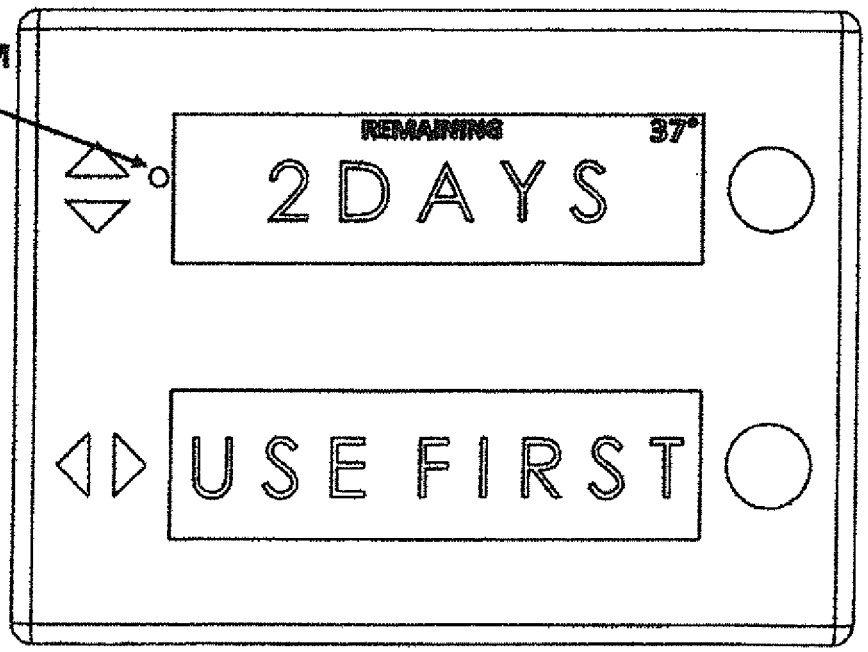
FIG. 27A-B shows the timer may include a button on any side of the timer that will change the screen view from time "lapse" to time "remaining".
Figure 27B:
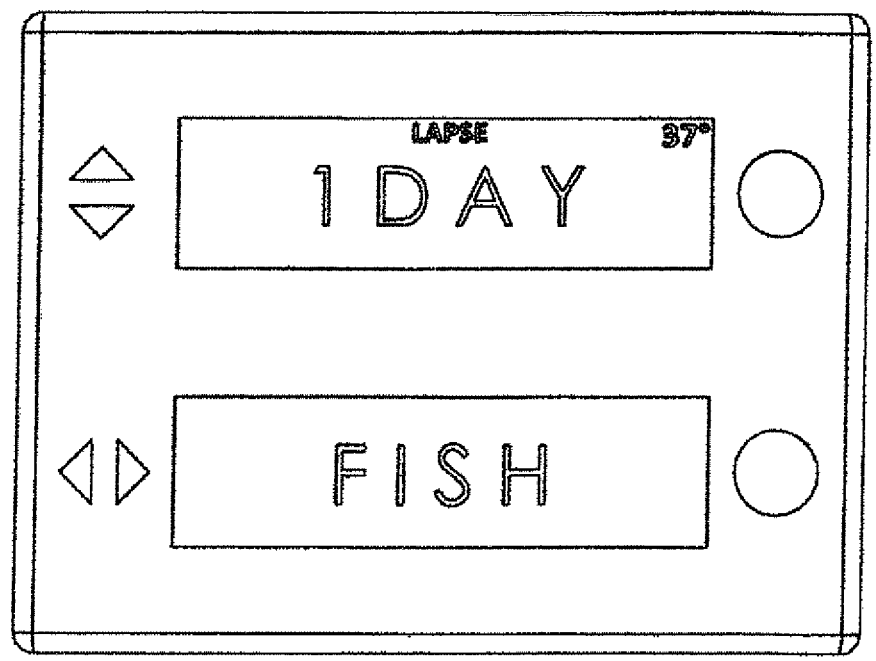

FIG. 26 shows an option on the display to have the time remaining be in enlarged on the display screen and the time that has lapsed be in the upper corner for tracking.

Figure 28:
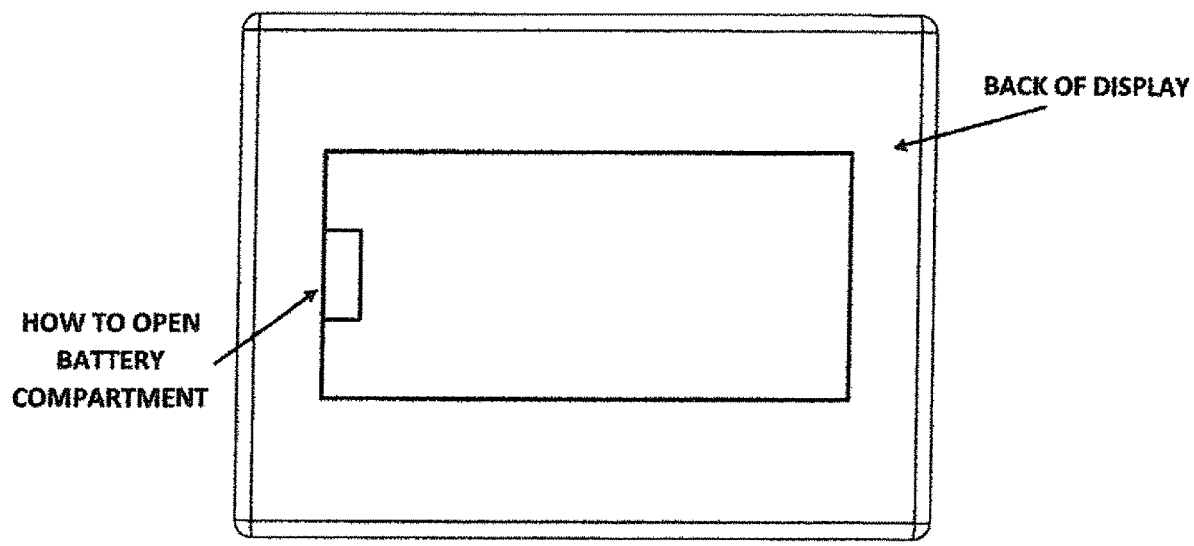
FIG. 28 shows that the display may be battery powered and contain a battery compartment that can be accessed from the back of the display. There may be a small release on the side that will open up the compartment. This compartment is shown as rectangular but may be any shape depending on the battery type.
Figure 29:
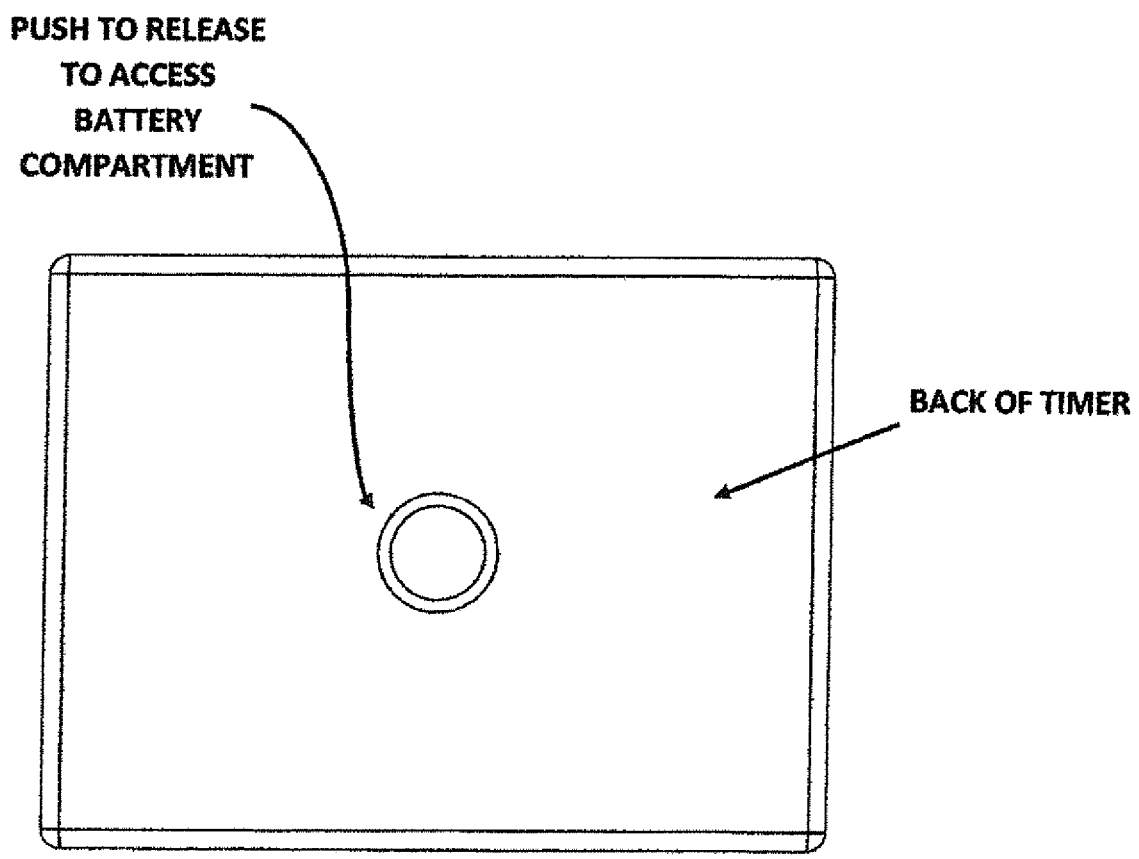
FIG. 29 shows that the display may be battery powered and contain a battery compartment that can be accessed from the back of the display. The door of the battery compartment may be assessable by pressing the button and this will cause the door to release and grant access to the batteries. This compartment is shown as circular but may be any shape depending on the battery type.

FIGS. 28 & 29 shows the back of the display and how to open the battery component for replacement or charging.

Figure 30:
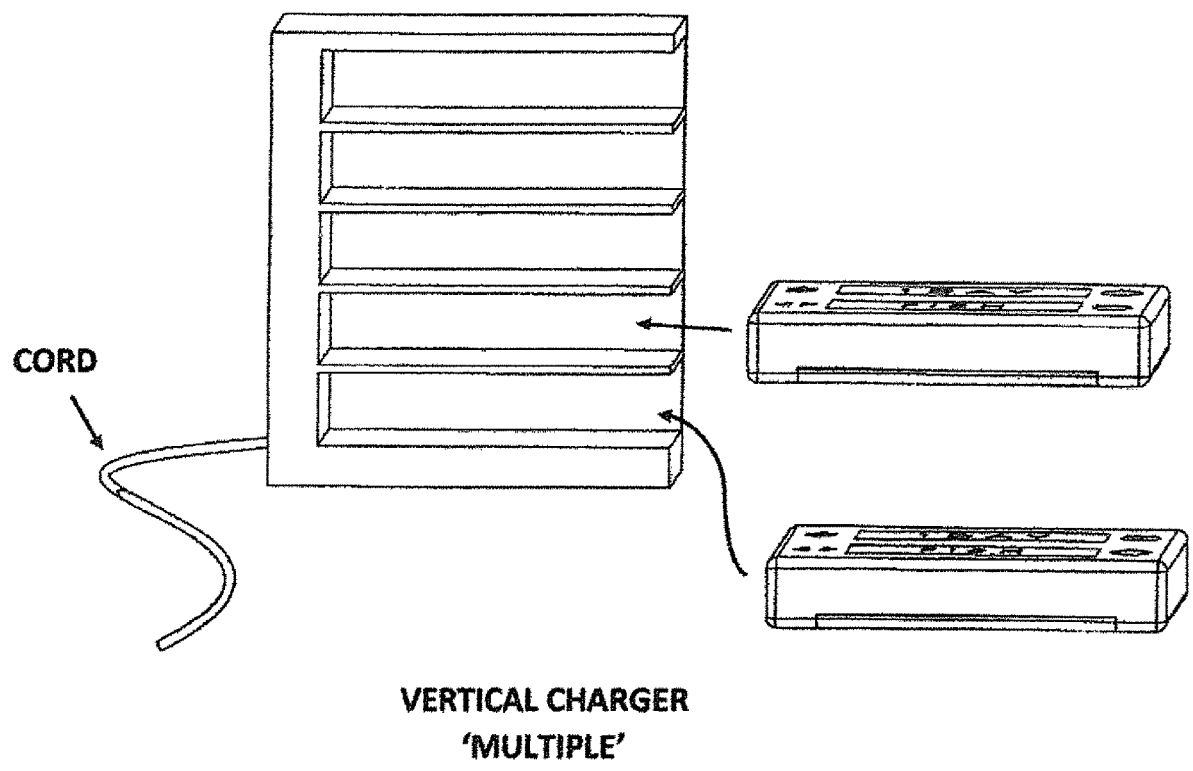
FIG. 30 shows that the display may be rechargeable. It may be have a vertical housing base with multiple different slots for displays to charge more than one at a time.
Figure 31:
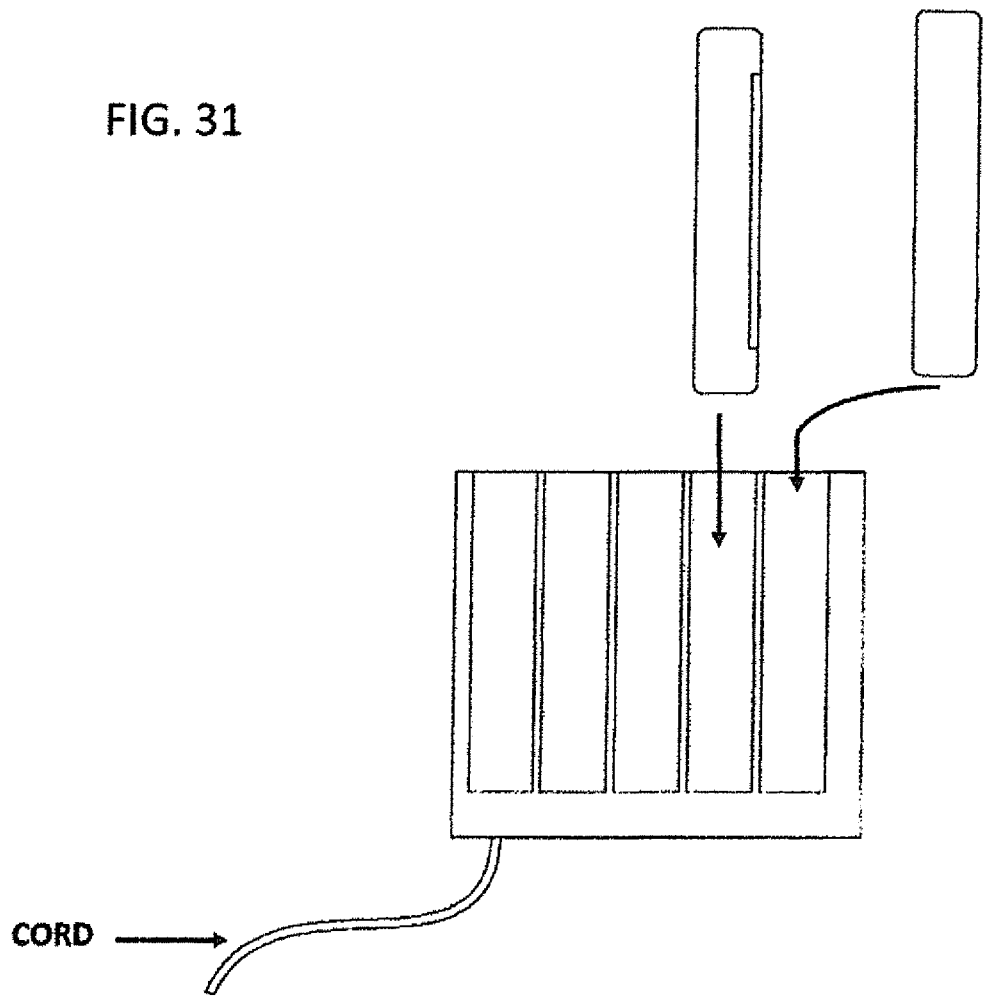
FIG. 31 shows that the display may be rechargeable. It may be have a horizontal housing base with multiple different slots for displays to charge more than one at a time.
Figure 32:
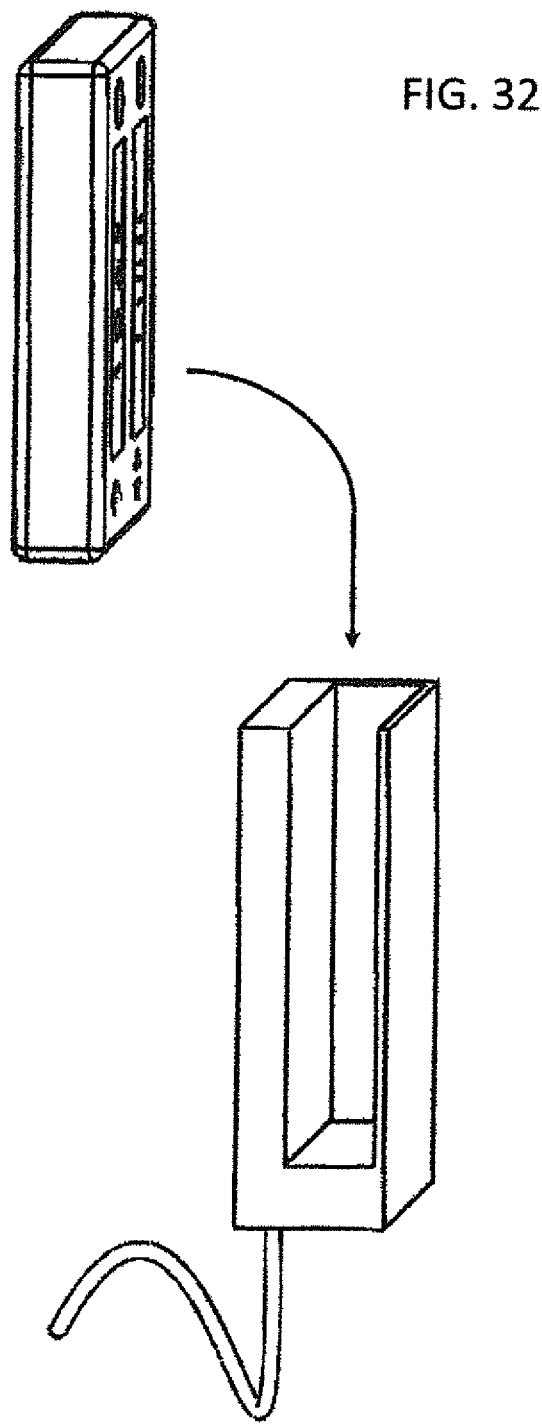
FIG. 32 shows that the housing charger may be vertical and charge only a single display at a time.
Figure 33:
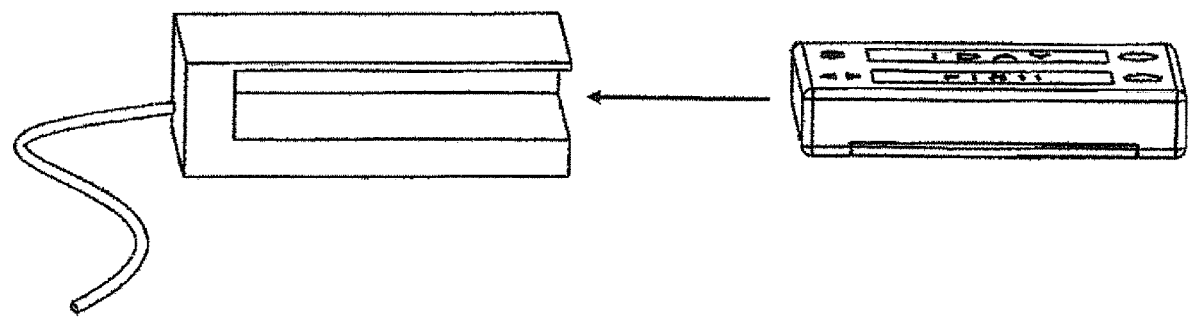
FIG. 33 shows that the housing charger may be horizontal and charge only a single display at a time.

Alternatively to having the display use replaceable batteries there is an option to have the display be chargeable. FIG. 30 shows a charging station for multiple display units that runs vertically. FIG. 31 shows the same concept only the charging station is horizontal. There is also an option to for the charging station to charge a single display rather than several. FIGS. 32 & 33 shows this both vertically and horizontally.

Figure 34:
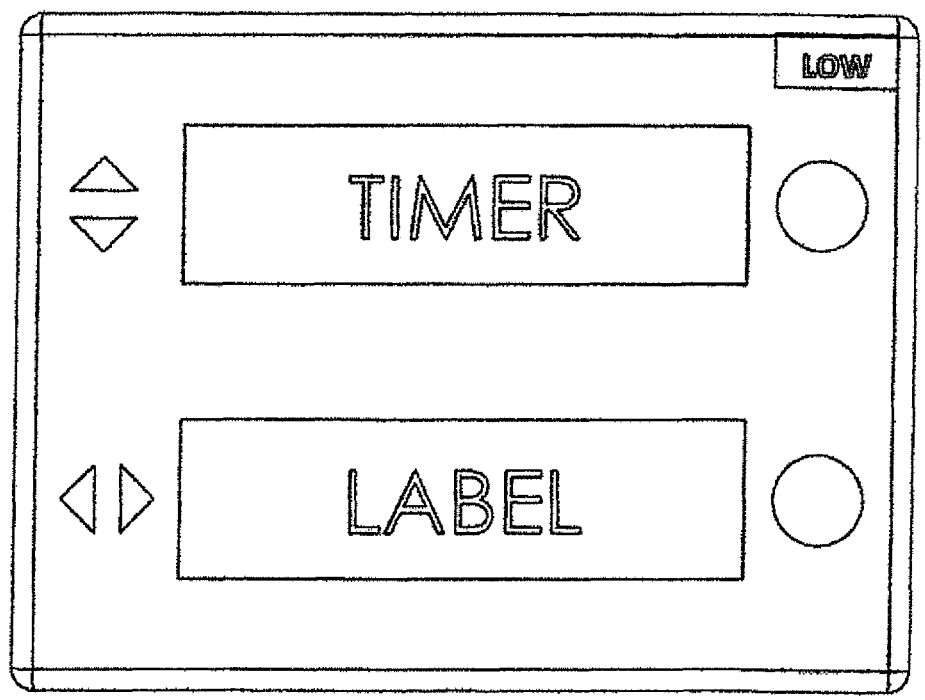
FIG. 34 shows that the display screen may give an alert such as "low battery, power low, plug me in or charge me".
Figure 35:
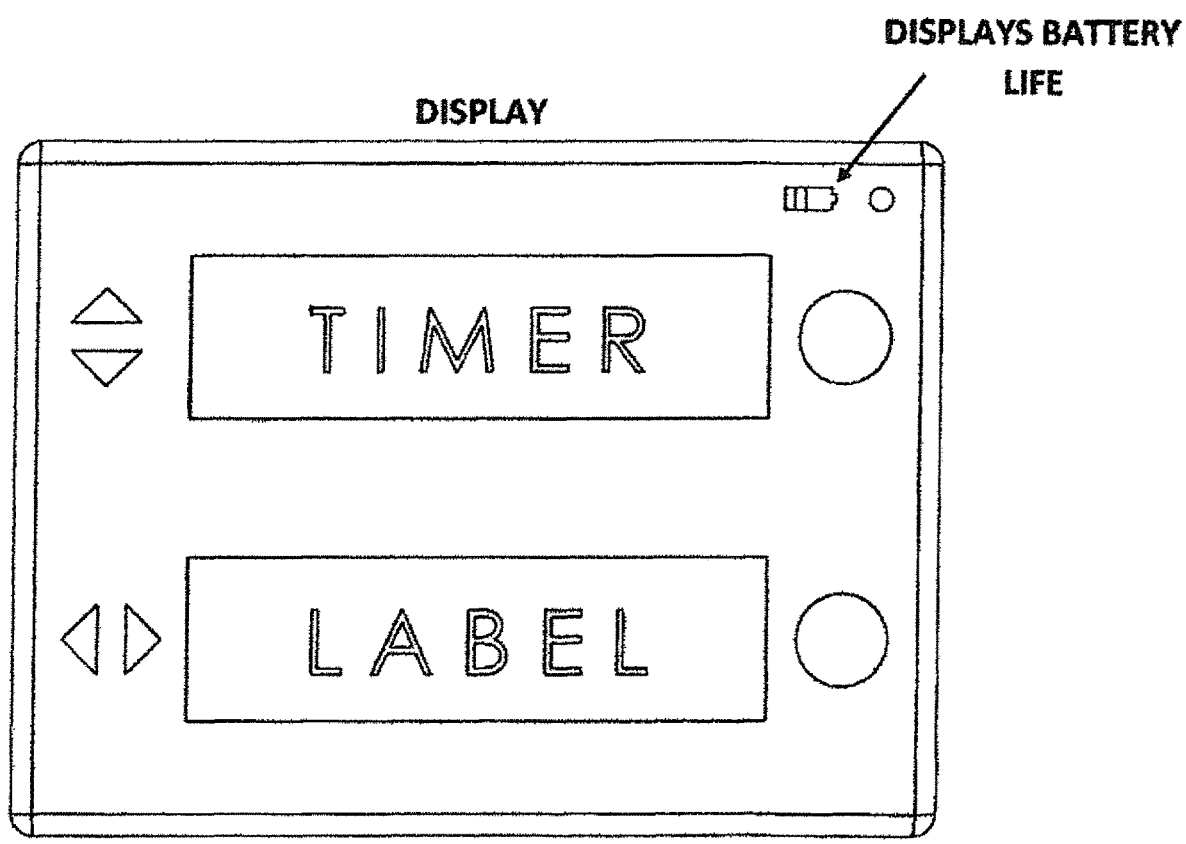
FIG. 35 Shows that the battery display screen may be digital. If digital it will have 'bars' that indicate it's battery life.
Figure 36:
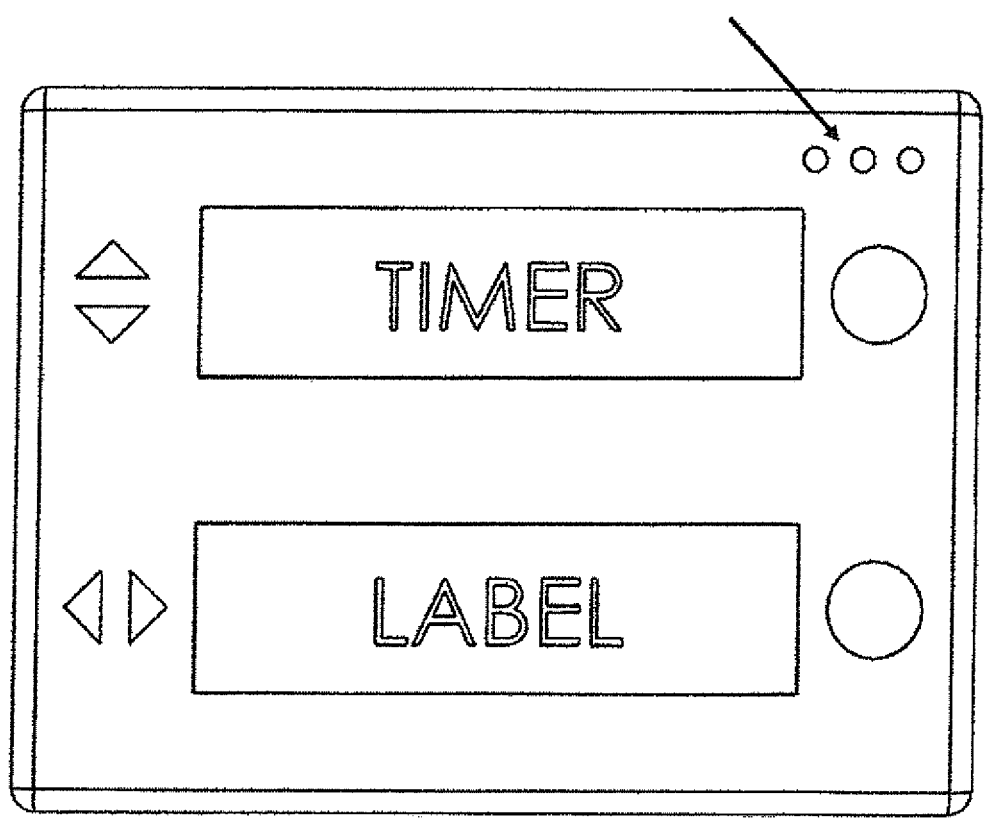
FIG. 36 shows that the indicators for battery life may be color dots signifying battery life. It may change from green, yellow, or red depending on how much charge is left.
Figure 37:
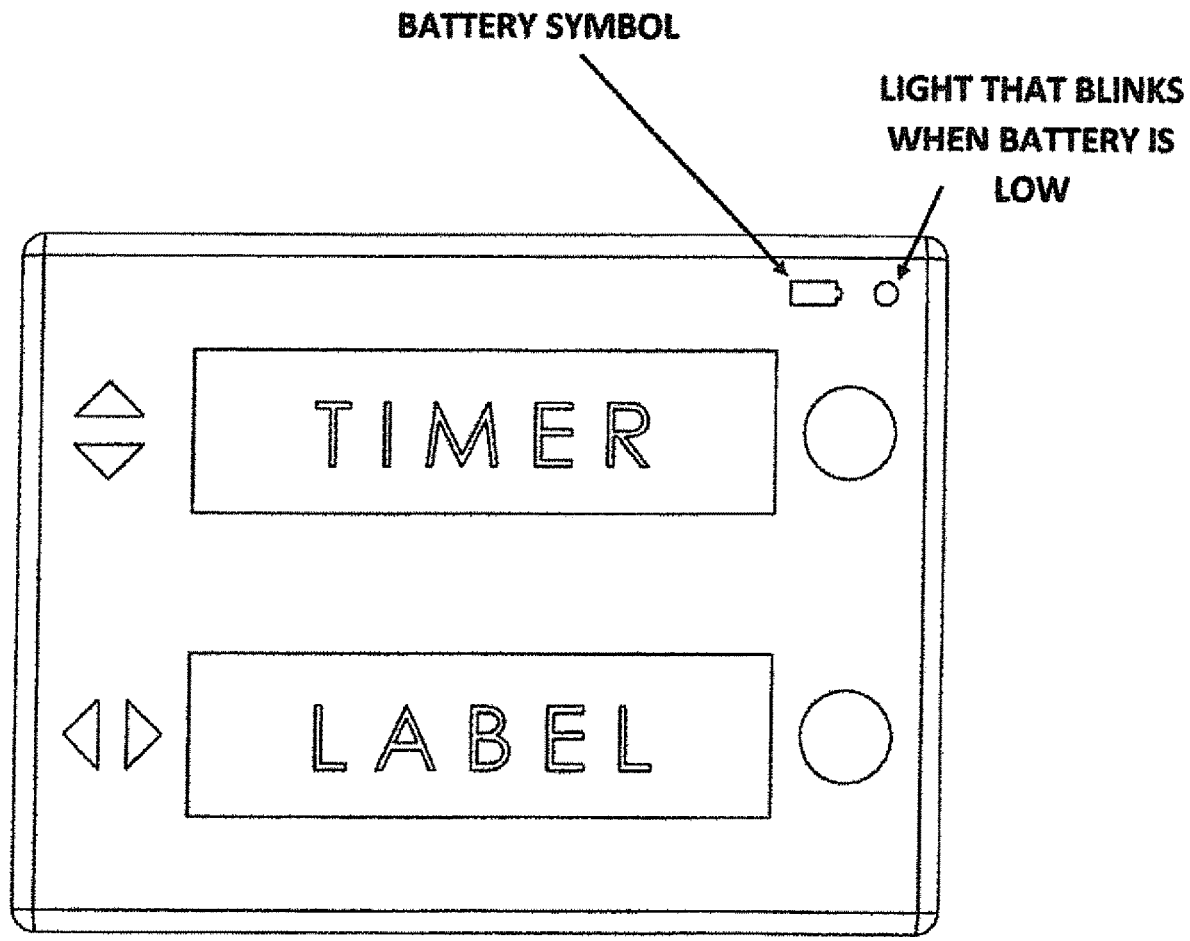
FIG. 37 shows that the battery may just a symbol up top and there may be a single light that changes colors to indicate battery life.

It is important to be aware of the battery life. There are a few different options for this. The first is to display written words in the upper right-hand corner to indicate charging is needed see FIG. 34. There is also the option to show lines that indicate the battery life. Three lines is fully charged and one is low See FIG. 35. The last option is to have lights in the upper right-hand corner that indicate battery life. The green light is fully charged, the yellow light is sufficient, and the red is low battery, see FIG. 36. The last option is to have a light that blinks or is solid when battery is low. This is in addition or solely to having the battery symbol see FIG. 37.

Figure 38:
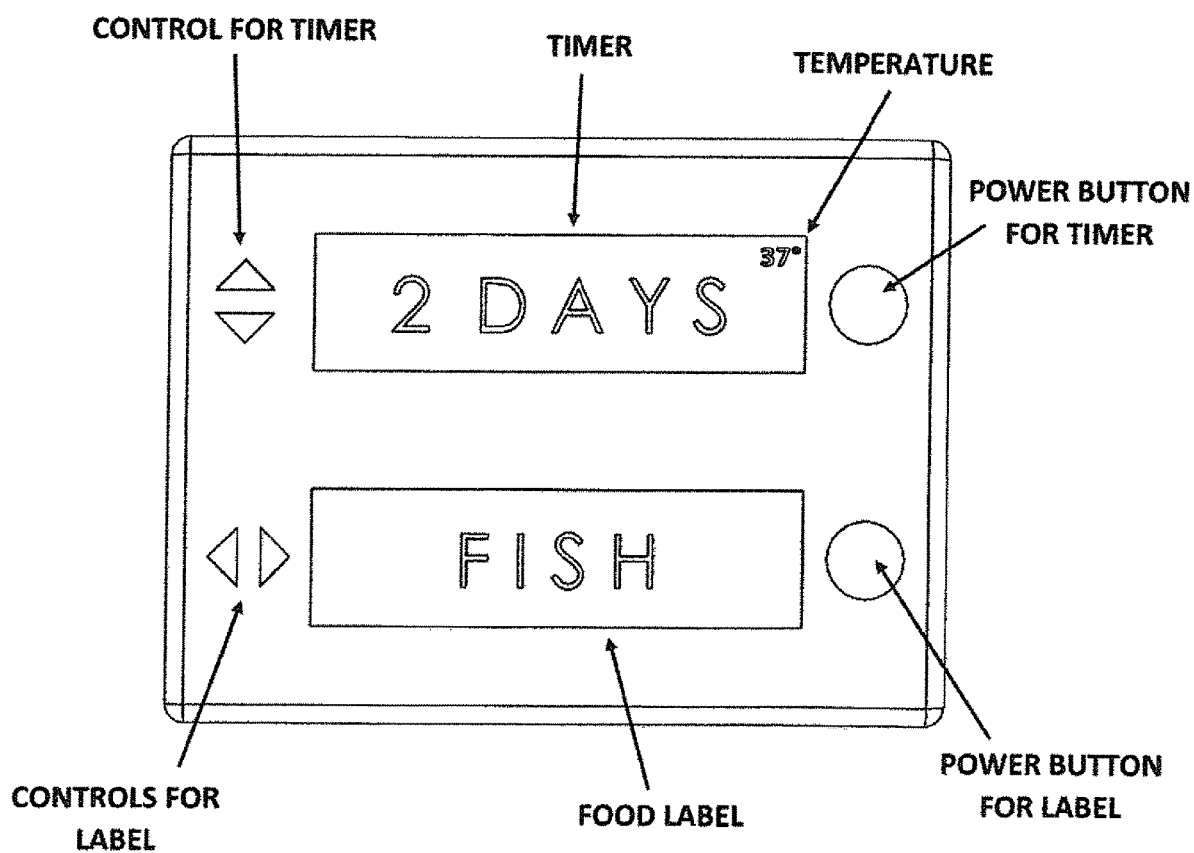
FIG. 38 shows a high level view of the display. Has the timer that may or may not include the temperature. Illustrates the power button that could be on either side of the timer. Shows the control arrows to set the time for desired time frame. It also shows the food label which has it's own power button that may be on either side and it's control arrows to scroll forward or backwards to select the desired entry.
Figure 39:
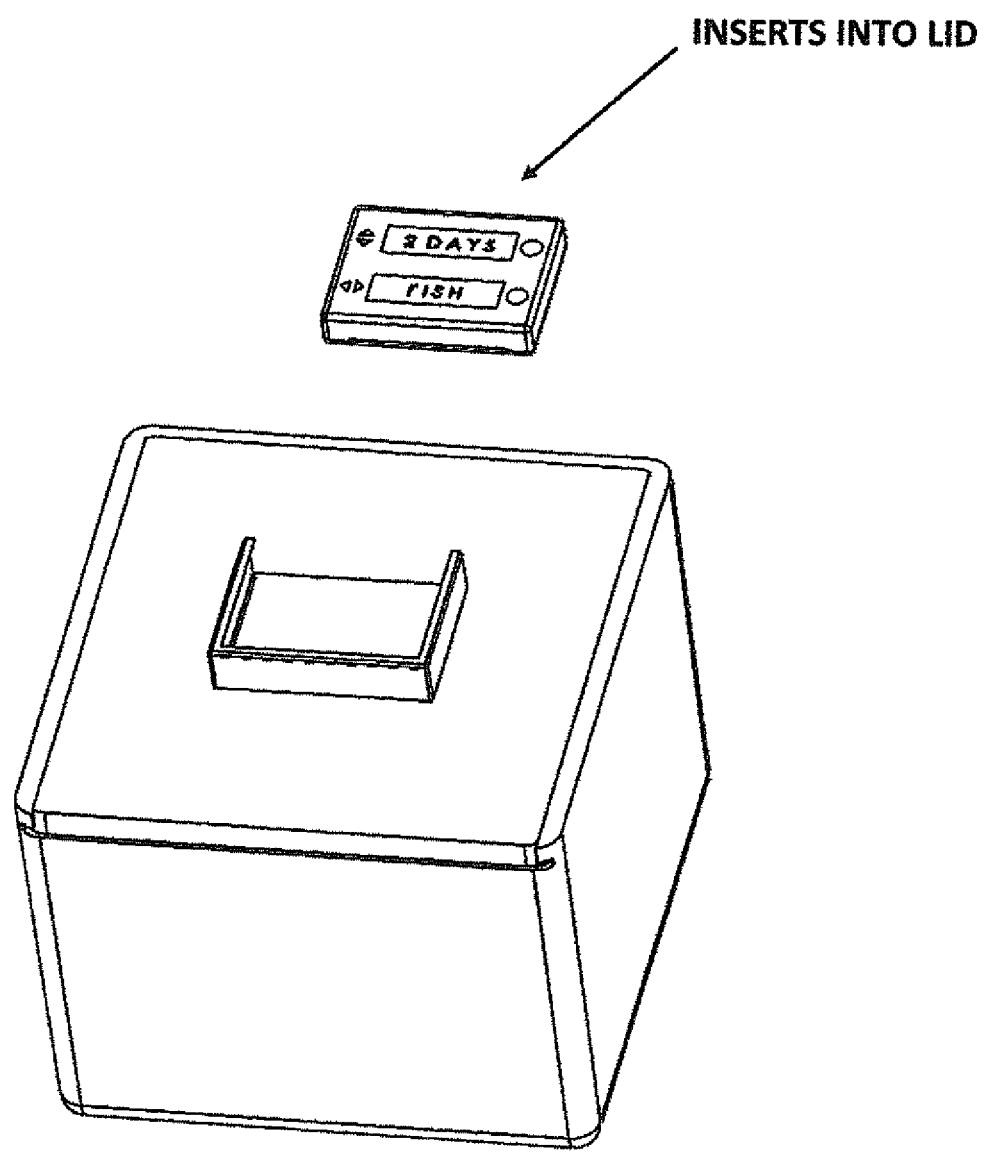
FIG. 39 shows that in addition or instead of having the display on the front of the container, it could be inserted into the lid.

It may be an option to have the temperature show on the display as shown in FIG. 38. The majority of the drawings show the display housing on the front of the container, however as FIG. 39 shows there's an option to have it inserted on the lid. It would be indented in the lid so it sat flat therefore making the containers stackable.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

What is claimed is new and desired to be protected by Letters Patent is set forth in the appended claims(s):

1. A food storage device comprising:
   a container;
   a lid slidable coupled to the container and sealing the container;
   an indented handle formed on the lid;
   a frame formed on one of the lid or the container, the frame having an open end and a pair of rails formed on opposing sides of the frame and forming the frame;
   a digital display, the digital display inserted into the open end of the frame engaging the pair of rails to be slidable within the frame, wherein the digital display shows when a content stored in the device is past a preset time indicating freshness.

2. The device of claim 1, wherein the digital display comprises input buttons to enter a type of food to be stored in the device.

3. The device of claim 1, wherein the digital display comprises input buttons to enter a date when a food item is stored in the device and an expiration date when the food item stored is to be discarded.

4. The device of claim 1, wherein the digital display comprises status lights.

5. The food storage device of claim 1, wherein the digital display is waterproof.

6. The food storage device of claim 1, wherein the digital display shows textual indicia of food stored in the device and an amount of time till the food spoils.

7. The food storage device of claim 1, wherein the frame extends above the exterior surface of one of the lid or the container.

* * * * *